US008057293B2

(12) United States Patent
Oomori

(10) Patent No.: US 8,057,293 B2
(45) Date of Patent: Nov. 15, 2011

(54) GAMING MACHINE AND GAMING SYSTEM

(75) Inventor: Tomoaki Oomori, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 1036 days.

(21) Appl. No.: 11/544,010

(22) Filed: Oct. 6, 2006

(65) Prior Publication Data

US 2007/0202944 A1 Aug. 30, 2007

(30) Foreign Application Priority Data

Oct. 7, 2005 (JP) ................................ 2005-294606

(51) Int. Cl.
*A63F 13/00* (2006.01)

(52) U.S. Cl. ........................................... 463/20; 463/26

(58) Field of Classification Search .................... 463/20, 463/25, 26

See application file for complete search history.

(56) References Cited

U.S. PATENT DOCUMENTS 5,695,402 A * 12/1997 Stupak ............................ 463/20
6,224,482 B1 * 5/2001 Bennett ........................... 463/20
6,913,534 B2 * 7/2005 DeFrees-Parrott et al. ..... 463/17
2003/0064810 A1 * 4/2003 Okada ............................ 463/42
2003/0162585 A1 * 8/2003 Bigelow et al. ................. 463/20
2004/0077422 A1 * 4/2004 Bryant et al. ................. 472/137
2004/0192432 A1 * 9/2004 Walker et al. .................. 463/20

FOREIGN PATENT DOCUMENTS

JP 2003-169881 A 6/2003
JP 2004-113547 A 4/2004
JP 2004-130119 A 4/2004

* cited by examiner

*Primary Examiner* — Peter DungBa Vo
*Assistant Examiner* — Allen Chan
(74) *Attorney, Agent, or Firm* — Arent Fox, LLP

(57) ABSTRACT

A gaming machine and a gaming system that may encourage a player to continue to play a game even though the player almost gives up winning a progressive jackpot are provided. After a part of bet coins is added to the progressive jackpot, if it is determined that the progressive jackpot is won (S47: Yes), a number of coins or the like equivalent to the amount of the progressive jackpot accumulated so far is paid out (S48). On the other hand, for example, one game number is determined from among three game numbers to trigger occurrence of a special combination. After a total game number N reaches the thus-determined game number (S44: Yes), a number of coins or the like equivalent to a predetermined payout amount is paid out (S45) upon winning of the special combination (S44-2: Yes).

11 Claims, 19 Drawing Sheets

| Code No. | Random numbers |
|---|---|
| 0 | 0~15 |
| 1 | 16~25 |
| 2 | 26~36 |
| 3 | 37~46 |
| 4 | 47~52 |
| 5 | 53~63 |
| 6 | 64~80 |
| 7 | 81~91 |
| 8 | 92~103 |
| 9 | 104~115 |
| 10 | 116~127 |

Fig. 5

| Code No. | | | Winning combination | Payout rate |
|---|---|---|---|---|
| Left reel | Center reel | right reel | | |
| 4 or 9 | 4 or 9 | 4 or 9 | 7-7-7 | 100 |
| 1 or 7 | 1 or 7 | 1 or 7 | 3BAR-3BAR-3BAR | 5 |
| 3 or 8 | 3 or 8 | 3 or 8 | 2BAR-2BAR-2BAR | 3 |
| 5 or 10 | 5 or 10 | 5 or 10 | BAR-BAR-BAR | 2 |
| 2 | 2 | 2 | Cherry-Cherry-Cherry | 1 |
| Other than the above | | | Losing combination | 0 |

Fig. 6

| Random No. | Game number to trigger ceiling combination | Payout rate | Game number to initiate notification effect prior to occurrence |
|---|---|---|---|
| 0~25 | 100 | 500 | 10 games before reach |
| 26~63 | 500 | 500 | 30 games before reach |
| 64~127 | 1000 | 500 | 50 games before reach |

Fig. 11

| Random No. | Game number to trigger ceiling combination | Payout rate | Game number to initiate notification effect prior to occurrence |
|---|---|---|---|
| 0~25 | 100 | 500 | 10 games before reach |
| 26~63 | 500 | 500 | 30 games before reach |
| 64~127 | 1000 | 500 | 50 games before reach |

Fig. 12

| Game number N (Ceiling combination) | Random number to win (range 0~15) | Probability to win |
|---|---|---|
| ±0 | 0 | 1/16 |
| +1~+50 | 0~1 | 2/16 |
| +51~+100 | 0~2 | 3/16 |
| +101~+200 | 0~3 | 4/16 |
| +201~ | 0~4 | 5/16 |

Fig. 13

| Random No. | Winning combination | Payout rate |
|---|---|---|
| 0～22 | 7 - 7 - 7 | 100 |
| 23～25 | 3BAR-3BAR-3BAR | 5 |
| 26～48 | 2BAR-2BAR-2BAR | 3 |
| 49～193 | BAR-BAR-BAR | 2 |
| 194～247 | Cherry-Cherry-Cherry | 1 |
| 248～1270 | Losing combination | 0 |

Fig. 14

GAMING MACHINE AND GAMING SYSTEM

CROSS REFERENCE TO RELATED APPLICATIONS

This application is based upon and claims the benefits of priorities from Japanese Patent Application No. 2005-294606 filed on Oct. 7, 2005, the entire contents of which are incorporated herein by reference.

FIELD OF THE INVENTION

The present invention relates to a gaming machine and a gaming system in which a progressive jackpot is conducted.

RELATED ART

Conventionally, a progress jackpot, in which a predetermined rate of the coins having been bet in many gaming machines such as slot machines is pooled (or accumulated) such that the cumulated amount is paid out at once upon establishment of a specific winning combination of much lower probability of occurrence, has been employed in a gaming system comprising the gaming machines being linked with each other (for example, see Japanese Unexamined Patent Application Publication No. 2004-130).

Also, the system to be referred to as "progressive jackpot" includes one system in which the progressive jackpot is independently made on each gaming machine irrespective of being linked or not.

And the system to be referred to as "progressive jackpot" is, for example, often characterized by a huge amount having been pooled because the probability of establishment and occurrence of the necessary specific winning combination is usually set very low.

However, in reality, it is quite rare for the player to get such a good luck to win the progressive jackpot for the amount having been pooled even though the player continues to play the game hoping to win the progressive jackpot. Therefore, only the system to be referred to as "progressive jackpot" is not enough to drive the player to continue the game.

SUMMARY OF THE INVENTION

In the present invention, a gaming machine and a gaming system in which the player is encouraged to continue to play the game even though the player almost gives up winning the progressive jackpot are provide.

Thus, the gaming machine comprising: a display device which displays symbols variably and statically upon betting game media; and a processor in communication with the display device. The processor is operable to: (a) select a plurality of symbols to be displayed statically as a game result by a lottery; (b) display a combination of the selected symbols statically; (c) award a player based on the game result corresponding to a predetermined winning combination of symbols; (d) provide the player with an amount of a progressive jackpot having been cumulatively collected from a part of a bet number of game media bet for each game with the gaming machine and other gaming machines equivalent to the gaming machine when the jackpot is won by a lottery conducted for every game; (e) conduct a special award lottery to determine whether or not to provide a predetermined award of the special combination for every game after a total game number reaches a game number having been determined by a trigger lottery; (f) provide the player with a predetermined award based on a result of the special award lottery; and (g) reset the total game number when the predetermined award is provided.

Further features of the present invention, its nature, and various advantages will be more apparent from the accompanying drawings and the following description of the preferred embodiment.

BRIEF DESCRIPTION OF THE DRAWINGS

FIG. 5 is an illustrative view of a lottery table of symbols to be stopped and displayed statically.

FIG. 6 is an illustrative view of winning combinations and payout rates thereof.

FIG. 11 is an illustrative view showing a lottery table of a number of games (game number) to trigger a ceiling combination and a table of payout rates and notification effects of the ceiling combination.

FIG. 12 is an illustrative view showing lottery tables of the number of games (game number) to trigger the ceiling combinations and tables of payout rates and notification effects of the ceiling combinations.

FIG. 13 is an illustrative view showing a lottery table to determine winning of the ceiling combination.

FIG. 14 is an illustrative view showing a lottery table of symbols to be stopped and displayed statically.

DESCRIPTION OF THE PREFERRED EMBODIMENTS

The following is a detailed explanation of a gaming machine of the present invention with the drawings used as references, based on embodiments in which the present invention is embodied as a slot machine. First, the outline structure of the slot machine according to the present embodiments is explained, with FIGS. 1 and 2 used as references.

Figure 1:
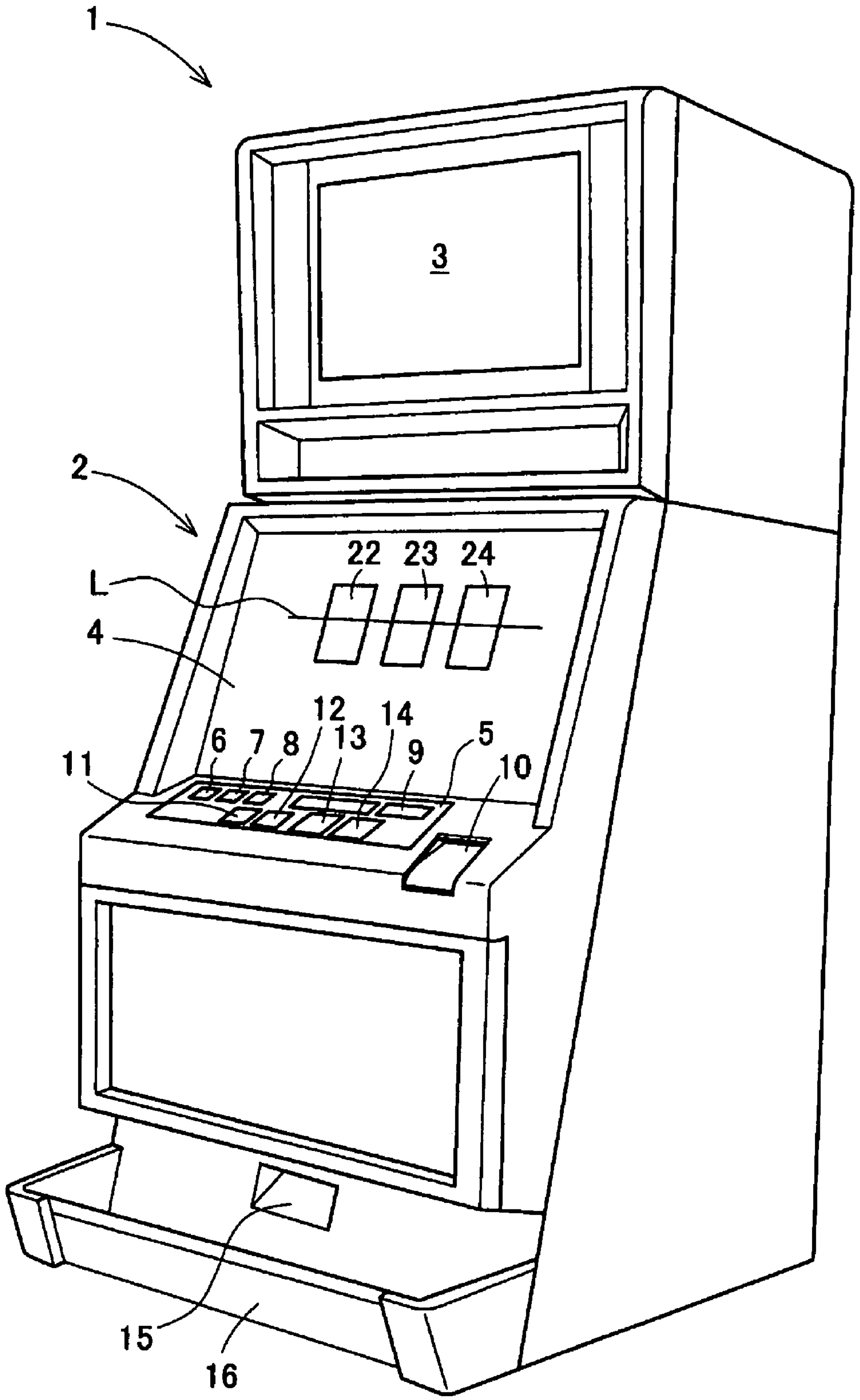
FIG. 1 is a perspective view of a slot machine.
Figure 2:
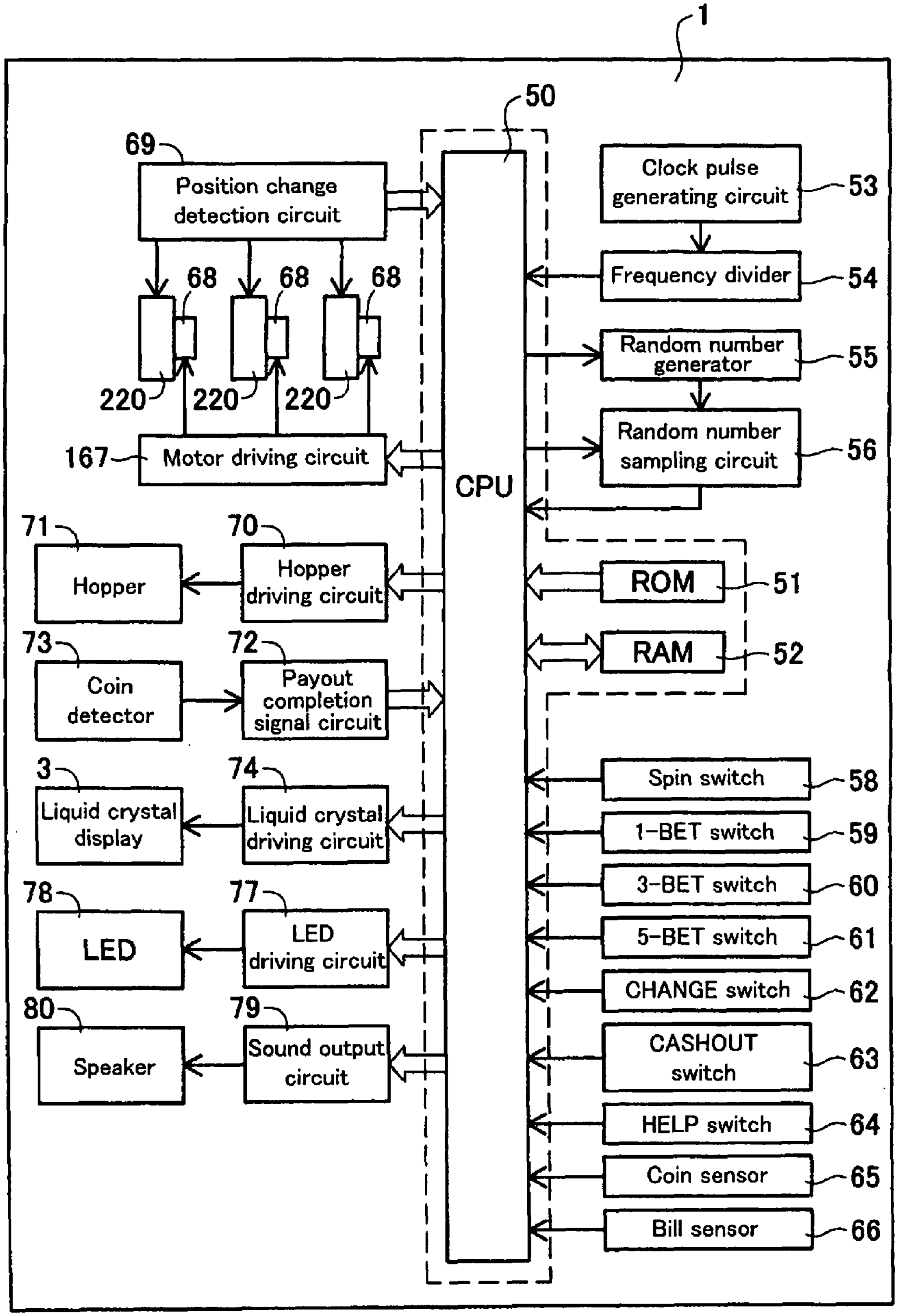
FIG. 2 is a block diagram showing schematically a control system of the slot machine.

FIG. 1 is a perspective view of the slot machine. FIG. 2 is a block diagram schematically showing a control system of the slot machine.

In FIG. 1, a slot machine 1 is composed of a cabinet 2, which forms the entirety of the slot machine. On the front upper portion of the cabinet 2, a liquid crystal display 3 is provided, and in the front central portion of the cabinet 2, a front panel 4 is provided. Herein, the liquid crystal display 3 comprises a liquid crystal display for general use. The liquid crystal display 3 displays gaming methods, types of prizes and respective payouts thereof, as well as information related to the game, such as various presentations made during a game. In addition, the front panel 4 is provided with three variable display parts 22 to 24, as well as a pay line L. Moreover, the variable display parts 22 to 24 display the arrays of symbols 241 to 243 of FIG. 7 (described hereinbelow) as changing while scrolled down in the direction from top to bottom.

An operation table 5, which protrudes to the front, is provided on the lower side of the front panel 4. A change (CHANGE) button 6, a payout (CASH-OUT) button 7, and a help (HELP) button 8 are provided to the operation table 5 from the far left to the right. A coin slot (coin insertion part) 9 and a bill slot (bill insertion part) 10 are provided to the right of the help button 8. In addition, a 1-BET button 11, a spin (SPIN/REPEAT BET) button 12, a 3-BET button 13, and a 5-BET button 14 are provided to the front of the operation table 5 from left to right.

The change (CHANGE) button 6 serves as a button which is pressed when exchanging a bill placed into the bill insertion part 10; and the coins resulting from this bill exchange are paid out through a coin payout opening 15 onto a coin receptacle (coin receiving part) 16, which are both provided to the lower portion of the cabinet 2. A change (CHANGE) switch 62 (described hereinbelow) is provided to the change (CHANGE) button 6. A switch signal from the change (CHANGE) switch 62 is outputted to a CPU 50 based on the depression of the change (CHANGE) button 6 (see FIG. 2).

The payout (CASH-OUT) button 7 serves as a button which is pressed when the game is completed. When the payout (CASH-OUT) button 7 is pressed, coins which have been acquired during the game are paid out through the coin payout opening 15 onto the coin receiving part 16. A payout (CASH-OUT) switch 63 (described hereinbelow) is provided to the payout (CASH-OUT) button 7. A switch signal is outputted to the CPU 50 based on the depression of the payout (CASH-OUT) button 7 (see FIG. 2).

The help button 8 serves as a button which is pressed when the method of operation for the game or the like is unclear. When the help button 8 is pressed before the game has been started, various types of help information are displayed on the liquid crystal display 3. When the help button 8 is pressed during the game, the total number N of games played is displayed on the liquid crystal display 3. A help (HELP) switch 64 (described hereinbelow) is provided to the help button 8. A switch signal from the help switch 64 is outputted to the CPU 50 based on the depression of the help button 8 (see FIG. 2).

A coin sensor 65 (described hereinbelow) is provided to the coin insertion part 9. When coins are placed in the coin insertion part 9, a coin detection signal is outputted to the CPU 50 via the coin sensor 65 (see FIG. 2).

A bill sensor 66 (described hereinbelow) is provided to the bill insertion part 10. When bills are placed in the bill insertion part 10, a bill detection signal is outputted to the CPU 50 via the bill sensor 66 (see FIG. 2).

The 1-BET button 11 is a button to be pressed for betting one bet each time when this button is pressed. A 1-BET switch 59 (described hereinbelow) is provided to the 1-BET button 11. When 1-BET button 11 is pressed, a switch signal is outputted to the CPU 50 from the 1-BET switch 59 based on the depression of the button (see FIG. 2).

The spin (SPIN/REPEAT BET) button 12 serves as a button which initiates the game with the current bet number or the previously-used bet number, based on the depression of the button. A spin (SPIN/REPEAT BET) switch 58 (described hereinbelow) is provided to the spin (SPIN/REPEAT BET) button 12. When the spin (SPIN/REPEAT BET) button 12 is pressed, a switch signal from the spin (SPIN/REPEAT BET) switch 58 is outputted to the CPU 50 based on the depression of the button (see FIG. 2). The bet numbers that can be selected by pressing the spin (SPIN/REPEAT BET) button 12 are 1, 2, 3, and 5 bets.

The 3-BET button 13 is a button which enables 3 bets to be made based on the depression of the button. A 3-BET switch 60 (described hereinbelow) is provided to the 3-BET button 13. When the 3-BET button is pressed, a switch signal from the 3-BET switch 60 is outputted to the CPU 50 (see FIG. 2). The 5-BET button 14 is a button which enables 5 bets to be made based on depression of the button. A 5-BET switch 61 (described hereinbelow) is provided to the 5-BET button 14. A switch signal from the 5-BET switch 61 is outputted to the CPU 50 based on the depression of the button (see FIG. 2).

The coin payout opening 15 is formed on the lower portion of the cabinet 2, and the coin receiving part 16 for receiving paid-out coins from the coin payout opening 15 is provided thereto. A coin detector 73 (described hereinbelow) comprising a sensor or the like is provided to the inside of the coin payout opening 15. The coin detector 73 detects the number of coins paid out from the coin payout opening 15 (see FIG. 2).

Three reels 220 are aligned on the back side of the front panel 4, and are rotatably supported independent of each other (see FIG. 2). The game is played while viewing the symbols on the reels 220, which can be seen through the variable display parts 22 to 24 in the front panel 4.

The following is an explanation of the reels 220. From among the three reels 220, as seen from the front of the slot machine 1, the reel 220 disposed on the left faces the left variable display part 22, the reel 220 disposed in the middle faces the middle variable display part 23, and the reel 220 disposed on the right faces the right variable display part 24 (see FIG. 2). The variable display parts 22 through 24 are all formed on the front panel 4.

Figure 4:
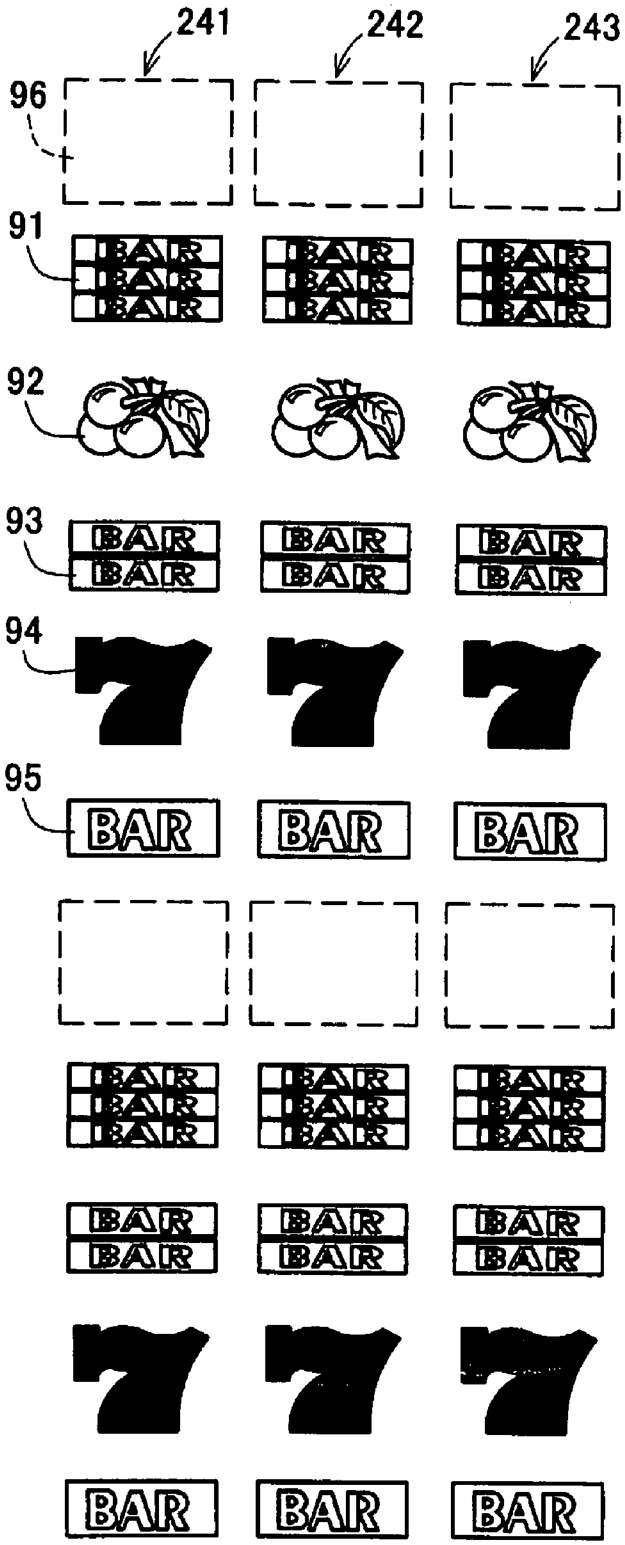
FIG. 4 is an illustrative view of symbol arrays, which are formed on the peripheral surface of each reel, to be displayed variably and statically as being scrolled in each variable display part.

The following is an explanation, made with reference to FIG. 4, of the symbols that are formed on the peripheral surfaces of the reels 220, and that are variably and statically displayed on the variable display parts 22 to 24. In FIG. 4, the array of symbols 241 represent the array of symbols which are variably and statically displayed on the left variable display part 22, the array of symbols 242 represent the array of symbols which are variably and statically displayed on the variable display part 23, and the array of symbols 243 represent the array of symbols which are variably and statically displayed on the variable display part 24.

Herein, the arrays of symbols 241 to 243 are identical, and these arrays of symbols are constituted of eleven (11) symbols appropriately arranged by selecting them from a triple BAR 91, cherry 92, double BAR 93, seven 94, single BAR 95, and blank (region in which no symbol is present) 96.

When the arrays of symbols 241, 242, and 243 that have been variably displayed while scrolled are then statically displayed in the variable display parts 22 to 24, three symbols are statically displayed in the respective variable display parts.

Various types of prizes are preliminarily set based on combinations of multiple types of symbols. When a combination of symbols corresponding to a prize is stopped on the pay line L, coins are paid out according to the prize. In this regard, the present slot machine functions in the same manner as a traditional slot machine. Therefore, an explanation regarding this point is omitted.

When forming various types of symbol combinations on the peripheral surfaces of the reels 220, a common procedure is adopted in which 11 symbol combinations are printed on long reel sheets which correspond to the width and circumference of the reels 220, and the reel sheets are then attached to the peripheral surface of the reels 220. It is apparent, however, that it is also possible to form the symbols by using a different procedure.

The following is an explanation of a structure related to the control system of the slot machine 1, in reference to FIG. 2. FIG. 2 is a block diagram schematically showing a control system of the slot machine.

In FIG. 2, the control system of the slot machine 1 is configured substantially with a CPU 50 as a core element thereof; and a ROM 51 and a RAM 52 are connected to the CPU 50. The ROM 51 stores a main process program (described hereinbelow), a payback/end control process program, various presentation programs for displaying various presentations on the liquid crystal display 3 along with the progression of the game, a lottery table for the lot drawing of the symbol combinations displayed statically in the game, and other various programs and data tables necessary for controlling the slot machine 1. The RAM 52 is memory which temporarily stores various types of data computed by the CPU 50.

A clock pulse generating circuit 53 for generating a basic clock pulse, and a frequency divider 54 are connected to the CPU 50. A random number generator 55 for generating random numbers and a random number sampling circuit 56 are also connected to the CPU 50. The random numbers which are sampled through the random number sampling circuit 56 are utilized for various types of prizes and other lot drawings. Furthermore, the CPU 50 is also connected to the spin (SPIN/REPEAT BET) switch 58 provided to the spin (SPIN/REPEAT BET) button 12, the 1-BET switch 59 provided to the 1-BET button 11, the 3-BET switch 60 provided to the 3-BET button 13, the 5-BET switch 61 provided to the 5-BET button 14, the change (CHANGE) switch 62 provided to the change (CHANGE) button 6, the payout (CASH-OUT) switch 63 provided to the payout (CASH-OUT) button 7, and the help (HELP) switch 64 provided to the help button 8. The CPU 50 controls operations that correspond to each button on the basis of the switch signals which are output from the above switches according to the depression of the buttons.

Three step motors 68 for rotating the reels 220 via a motor driving circuit 167 are connected to the CPU 50. A position change detecting circuit 69 is also connected to the CPU 50. When the CPU 50 outputs a motor drive signal (command pulse) to the motor driving circuit 167, each of the step motors 68 is rotatably driven by excitation signals output from the motor driving circuit 167. The reels 220 are thereby rotated.

At this time, the CPU 50 counts the number of drive pulses supplied to each of the step motors 68. The CPU 50 determines the rotation positions of the symbols on the reels 220 based on the number of drive pulses counted, controls the stop positions, and the like.

The position change detecting circuit 69 is connected to the CPU 50. The position change detecting circuit 69 detects changes made to the stop positions of the reels 220 after the reels have been brought to a controlled stop by the motor driving circuit 167.

Furthermore, the coin sensor 65 provided to the coin insertion part 9, as well as the bill sensor 66 provided to the bill insertion part 10 are connected to the CPU 50. The coin sensor 65 detects the coins inserted into coin insertion part 9, and the CPU 50 computes the number of inserted coins on the basis of the coin detection signal outputted from the coin sensor 65. The bill sensor 66 detects the types and amounts of bills inserted into the bill insertion part 10, and the CPU 50 computes the amounts of the bills and the number of coins equivalent to the bills, based on the bill detection signal outputted from the bill sensor 66.

A hopper 71 is connected to the CPU 50 via a hopper driving circuit 70. When the CPU 50 outputs a drive signal to the hopper driving circuit 70, the hopper 71 pays out a predetermined number of coins from the coin payout opening 15.

The coin detector 73 is connected to the CPU 50 via a payout completion signal circuit 72. The coin detector 73 is provided to the inside of the coin payout opening 15. The coin detector 73 outputs a coin discharging detection signal to the payout completion signal circuit 72 when it has been detected that a pre-determined number of coins has been paid out through the coin payout opening 15. The payout completion signal circuit 72 outputs a payout completion signal to the CPU 50 based on these signals. Furthermore, the liquid crystal display 3 is connected to the CPU 50 via a liquid crystal driving circuit 74, and the liquid crystal display 3 is controlled by the CPU 50.

Figure 3:
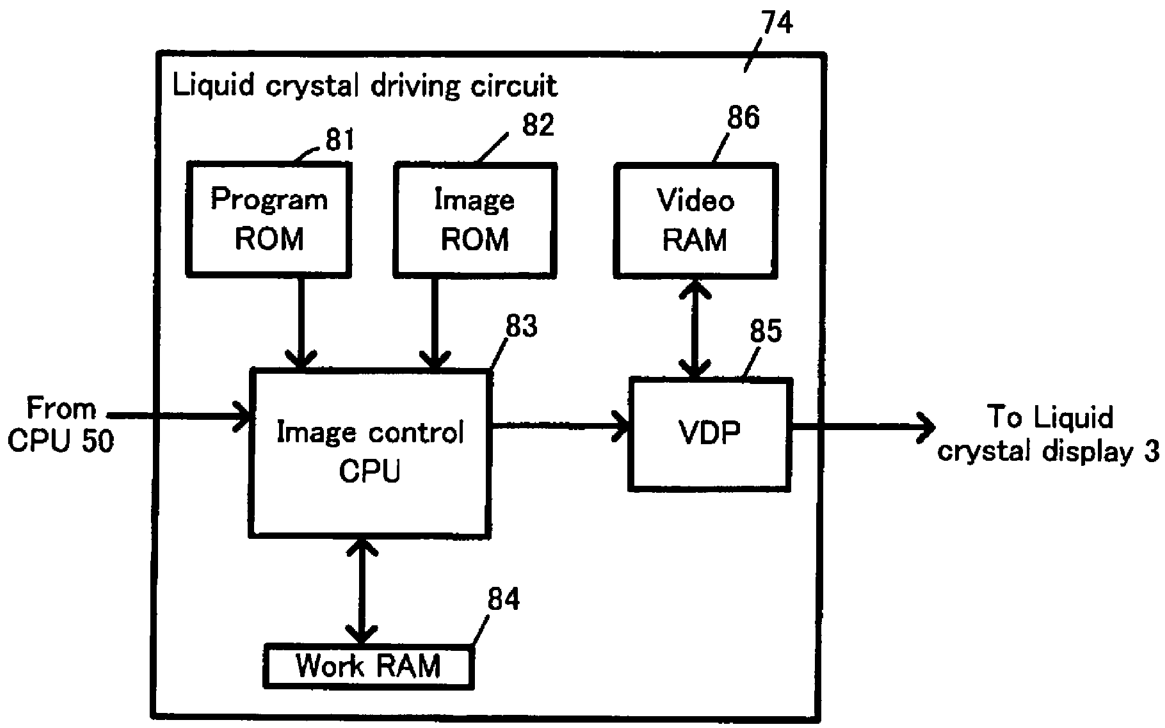
FIG. 3 is a block diagram showing schematically a liquid crystal driving circuit of a liquid crystal display.

The liquid crystal driving circuit 74 comprises a program ROM 81, an image ROM 82, an image controller CPU 83, a work RAM 84, a VDP (Video Display Processor) 85, a video RAM 86, and the like, as shown in FIG. 3. Programs that control the images displayed on the liquid crystal display 3, as well as various types of selection tables, are stored in the program ROM 81. The image ROM 82 stores, for example, DOT data for forming images displayed on the liquid crystal display 3. The image controller CPU 83 determines, from among the DOT data stored in advance in the image ROM 82, the images to be displayed by the liquid crystal display. The determination is made according to the image control program stored in advance in the program ROM 81, and is based on the parameters set by CPU 50. The work RAM 84 is configured as temporary storage means when the image control program is executed by the control CPU 83. The VDP 85 forms images according to the displayed content selected by the image control CPU 83, and outputs the images to the liquid crystal display 3. The video RAM 86 is configured as temporary storage means for forming images by the VDP 85.

Returning to FIG. 2, an LED 78 is connected to the CPU 50 via an LED driving circuit 77. When various types of presentations are made on the front side of the slot machine 1 by many LEDs provided thereto, the LED driving circuit 77 controls the LEDs to be turned on and off based on the drive signals from the CPU 50. Moreover, a sound output circuit 79 and a speaker 80 are connected to the CPU 50. The speaker 80 generates various types of sound effects based on the signal output from the sound output circuit 79 when various types of presentations are made.

The following is an explanation with reference to FIG. 5 regarding the lottery table used to determine the symbols which are to be statically displayed on the pay line L when conducting a game in the slot machine 1 by using the three variable display parts 22 to 24. FIG. 5 is an explanatory diagram showing the lottery table for the symbols to be statically displayed when a game is played using the three variable display parts.

The symbols to be statically displayed on the activated pay line L are determined for each of the variable display parts 22 to 24. In order to achieve the above, code numbers from "0" to "10" must be assigned to the arrays of symbols 241 to 243 for each of the variable display parts 22 to 24 (shown in FIG. 4), sequentially in order from highest to lowest. On the other hand, the lottery table as shown in FIG. 5 must be prepared. Three random numbers must be sampled by the random number sampling circuit 56 so as to correspond to each of the variable display parts 22 to 24.

For the sake of convenience in the following explanation, the array of symbols 241 for the left variable display part 22 is referred to as the "left reel," the array of symbols 242 for the central variable display part 23 is referred to as the "central reel," and the array of symbols 243 for the right variable display part 24 is referred to as the "right reel."

As shown in the lottery table in FIG. 5, when the random number sampled through the random number sampling circuit 56 falls within the range from 0 to 15, a blank 96 assigned to the code number "0" is statically displayed on the activated pay line L with regards to the "left reel" of the array of symbols 241 on the left variable display part 22. The same procedures apply below to the code numbers from "1" to "10," based on the lottery table shown in FIG. 8.

The same procedures as those used with the "left reel" of the array of symbols 241 on the left variable display part 22 apply to the "central reel" of the array of symbols 242 on the central variable display part 23, as well as to the "right reel" of the array of symbols 243 on the right variable display part 24.

The following is an explanation in reference to FIG. 6 regarding the prize and the corresponding payout when conducting a game in the slot machine 1 using the three variable display parts 22 to 24. FIG. 6 is an explanatory diagram showing the prize and the corresponding payout when conducting a game using the three variable display parts. In FIG. 6, when the code numbers assigned to the "left reel," "central reel," and "right reel" are all either "4" or "9," the combination "7-7-7" is won. In this case, sevens 94 are statically displayed on the activated pay line L in the variable display parts 22 to 24, and the player obtains the payout of "100." The same procedures apply below to the payouts of "5," "3," "2," and "1," based on the table shown in FIG. 6.

When the code numbers assigned to the "left reel," "central reel," and "right reel" have a combination other than the combinations described above, a "non-winning combination" is obtained. In this case, either a triple BAR 91, a cherry 92, a double BAR 93, a seven 94, a single BAR 95, or a blank 96 is statically displayed on the activated pay line L in the variable display parts 22 to 24, and no payout is given to the player.

Figure 7:
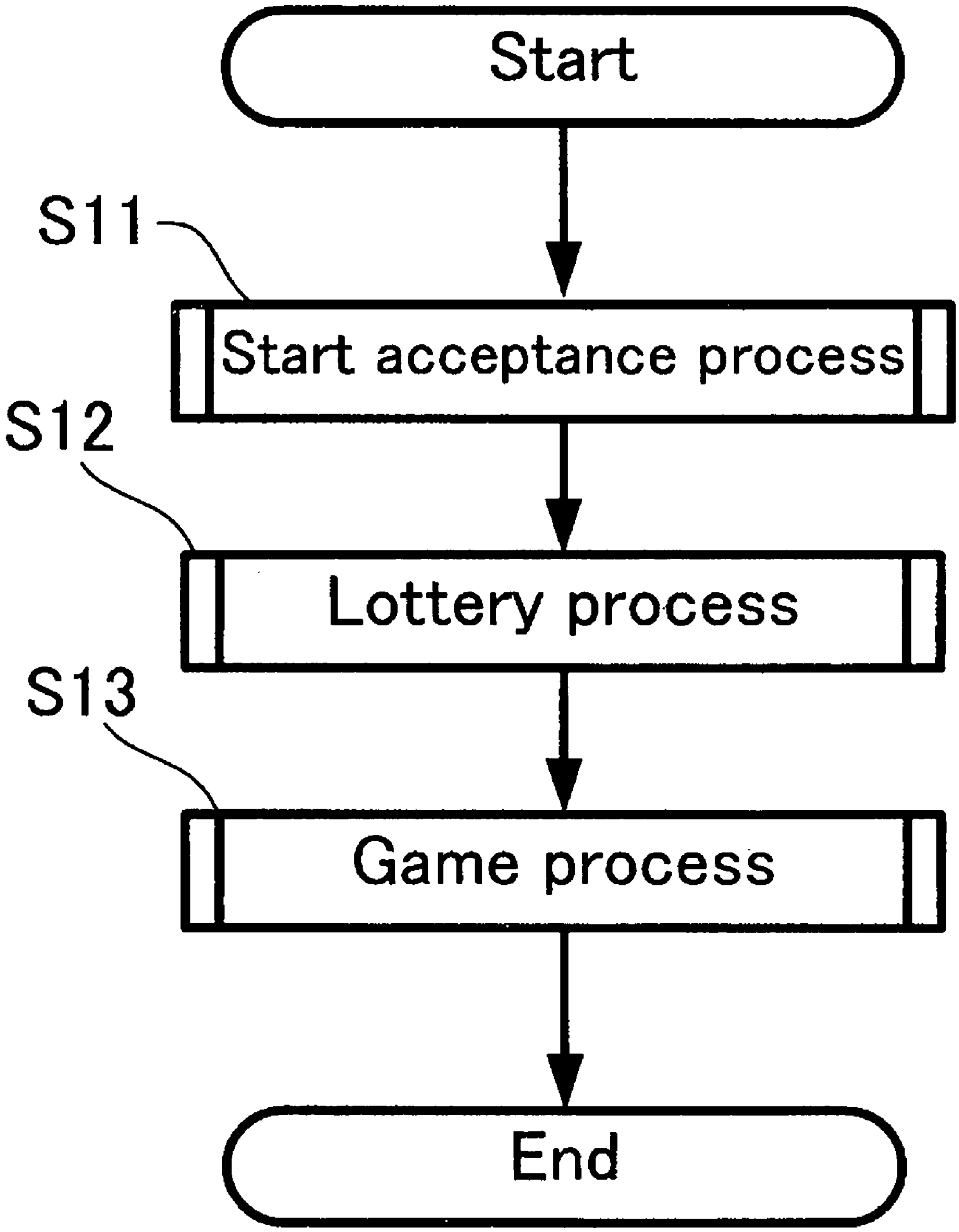
FIG. 7 is a flow chart of a main process program.
Figure 8:
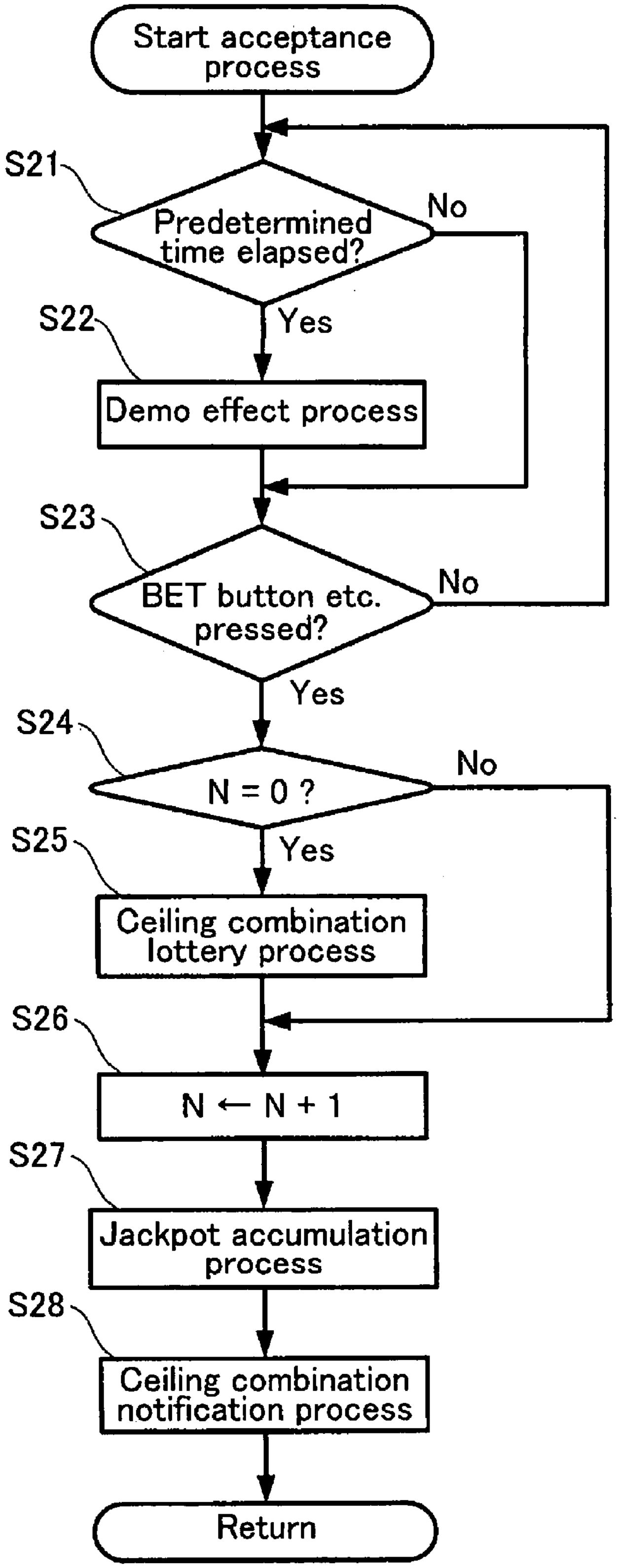
FIG. 8 is a flow chart of a start acceptance process program.

The following is an explanation of a main process program executed in the slot machine 1, in reference to FIG. 7. FIG. 7 is a flowchart of the main process program. In FIG. 7, the start acceptance process program (described hereinbelow) shown in FIG. 8 is first executed in step (hereafter, abbreviated as "S") 11. This is a process for accepting the switch signals outputted from the spin (SPIN/REPEAT BET) switch 58, 1-BET switch 59, 3-BET switch 60, and 5-BET switch 61, based on the operations of the spin (SPIN/REPEAT BET) button 12, 1-BET button 11, 3-BET button 13, and 5-BET button 14. The game is started when the switch signals outputted from the switches are accepted.

Figure 9:
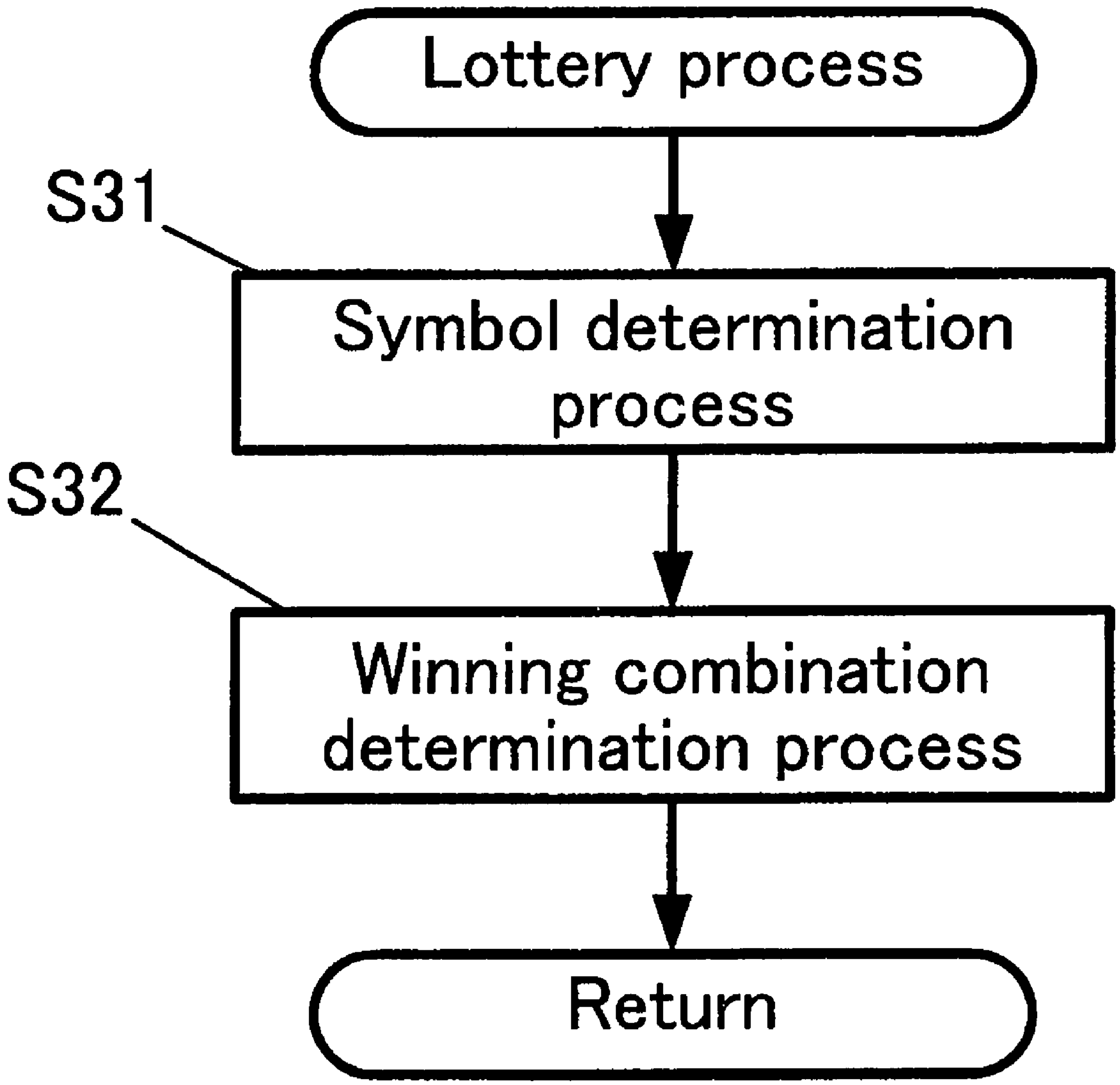
FIG. 9 is a flow chart of a lottery process program.

In S12, the lot drawing operation (described hereinbelow) shown in FIG. 9 is performed based on the switch signals outputted from the spin (SPIN/REPEAT BET) switch 58, 1-BET switch 59, 3-BET switch 60, and 5-BET switch 61.

Figure 10:
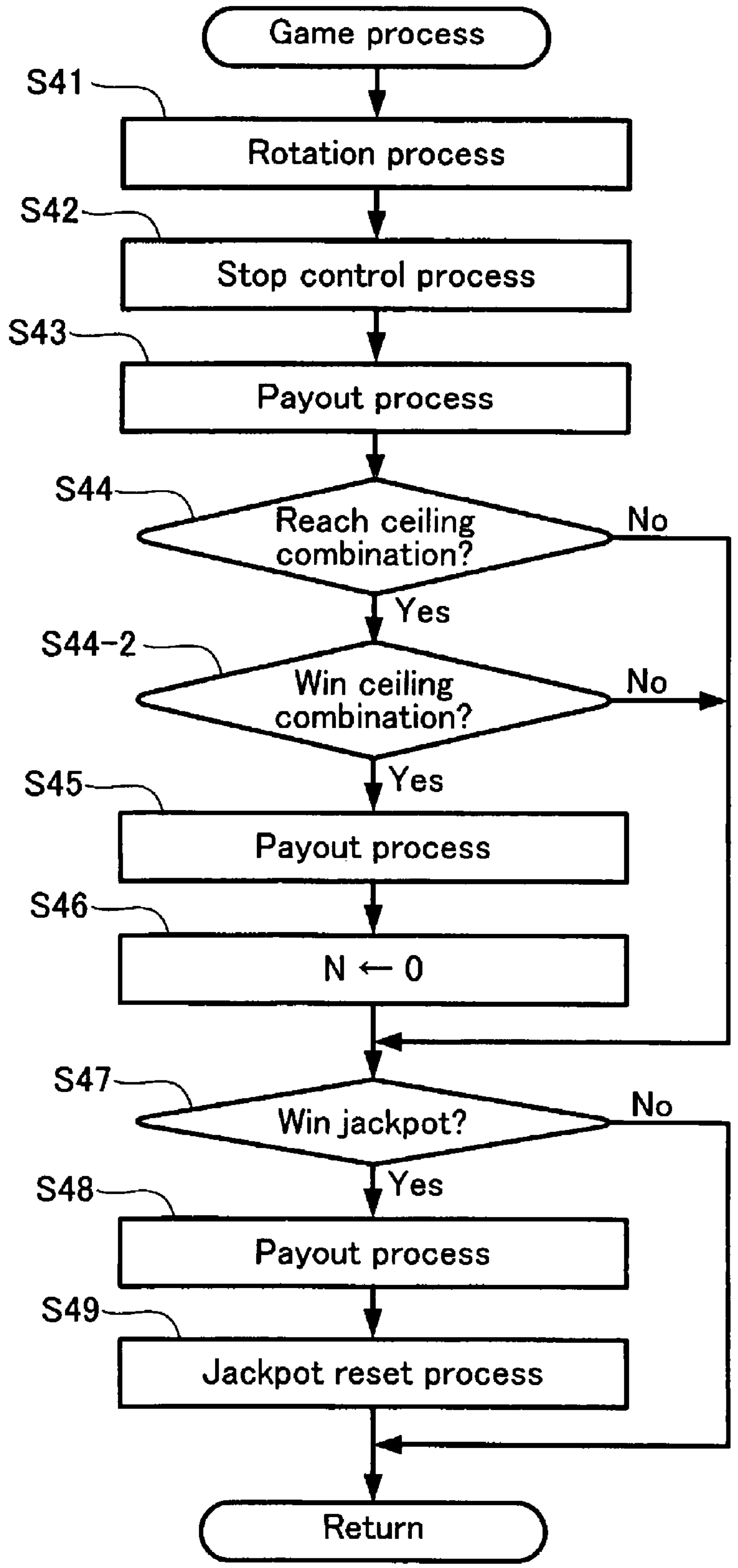
FIG. 10 is a flow chart of a game process program.

In the subsequent S13, the game process (described hereinbelow) shown in FIG. 10 is performed, and the main process program is subsequently completed.

The following is an explanation of the start acceptance process program executed in the slot machine 1, in reference to FIG. 8. FIG. 8 is a flowchart of the start acceptance process program. The start acceptance process is performed in S11 of the main process program shown in FIG. 7. To achieve this object, the process first proceeds to S21 shown in FIG. 8 to determine whether a pre-determined time period (for example, 15 seconds) has elapsed. If it is determined that the pre-determined time period has not elapsed (S21: NO), the process proceeds to S23 without conducting any operation. However, if it is determined that the pre-determined time period has elapsed (S21: YES), an audiovisual presentation is made in the liquid crystal display 3 in S22, and the process proceeds to S23. In S23, it is determined whether or not the spin (SPIN/REPEAT BET) button 12, 1-BET button 11, 3-BET button 13, and 5-BET button 14 have been operated. If it is determined that the 1-BET button 11 or the like has not been operated (S23: NO), the process returns to S21 to repeat the process described above. If it is determined that the 1-BET button 11 or the like have been operated (S23: YES), the process proceeds to S24 even if the machine is in the middle of the audiovisual presentation.

In S24, a determination is made as to whether the total number N of games played (i.e., the total game number) is "0." If it is determined that the total number N of games played is not "0" (S24: NO), then the process proceeds to S26. If it determined that the total number N of games played is "0" (S24: YES), then a ceiling combination lottery process (described hereinbelow) in S25 is performed, and the process proceeds to S26.

The following is an explanation of the ceiling combination lottery process in S25. FIG. 11 is an explanatory diagram showing a lottery table of the number of games played that causes the lot drawing for the ceiling combination, and also a table of the payout of the ceiling combination and the notifying presentation. In the ceiling combination lottery process in S25 in FIG. 8, the random number sampling circuit 56 samples a random number from a range of 0 to 127, and the number of games to trigger lot drawing for the ceiling combination is determined from the table in FIG. 11. Specifically, at this time, if the random number sampled by the random number sampling circuit 56 is in a range of 0 to 25, then "100" is determined to be the number of games (game number) that causes the lot drawing for the ceiling combination. If the random number sampled by the random number sampling circuit 56 is in a range of 26 to 63, then "500" is determined to be the number of games (game number) that causes the lot drawing for the ceiling combination. If the random number sampled by the random number sampling circuit 56 is in a range of 64 to 127, then "1000" is determined to be the number of games (game number) that causes the lot drawing for the ceiling combination.

Here, the determined number of games (game number) is the one only for this particular gaming machine such that the determined number will not be changed until the current player reaches the determined number of games (game number) with this particular gaming machine. Therefore, the player does not have to worry about losing an opportunity to obtain the ceiling combination in the end. On the other hand, the progressive jackpot is an award that only one of the players in the jackpot group can get where as the others lose such an opportunity.

The term "ceiling combination" refers to the winning combination whereby a determination is made by lot drawing for each game as to whether a payout is awarded. The lot drawing begins once the total number N of games played reaches the number determined to be the number of games (game number) that causes the lot drawing for the ceiling combination. The lot drawing then continues until the payout that corresponds to the ceiling combination is awarded. Referring to FIG. 11, a case is considered in which the number "100" is determined to be the number of games (game number) that causes the lot drawing for the ceiling combination. In this case, once the total number N of games played has reached "100," a determination is made by lot drawing for each game as to whether the payout of "500" will be awarded, as corresponds to the number of games (game number) that causes the lot drawing for the ceiling combination. Next, a case is considered in which the number "500" is determined to be the number of games (game number) that causes the lot drawing for the ceiling combination. In this case, once the total number N of games played has reached "500," a determination is made by lot drawing for each game as to whether the payout of "500" will be awarded, as corresponds to the number of games (game number) that causes the lot drawing for the ceiling combination. Next, a case is considered in which the number "1000" is determined to be the number of games (game number) that causes the lot drawing for the ceiling combination. In this case, once the total number N of games played has reached "1000," a determination is made by lot drawing for each game as to whether the payout of "500" will be awarded, as corresponds to the number of games (game number) that causes the lot drawing for the ceiling combination. A memory area is reserved in the RAM 52 for the total number N of games played, and when the payout is awarded, the total number of times the game has been played is initialized to "0" (refer to S46 in FIG. 10 described below).

As described above, the total number N of games played will not be increased unless the player continues to play the game and will not be reset or initialized (or set to zero) until the player wins the ceiling combination by the lottery. Therefore, the player may not have to concern that the opportunity to win the ceiling combination is deprived of. On the other hand, the progressive jackpot may be taken by someone in the same jackpot group.

Returning to FIG. 8, in S26, the current total number N of games played is computed by adding "1" to the present total number N of games played. In S27, a cumulative jackpot process is performed.

In the cumulative jackpot process in S27, some of the coins (and their value) that have been used for betting are added to a progressive jackpot. At this point, a memory area is reserved in the RAM 52 for the progressive jackpot.

In S28, a ceiling combination notification process is performed. In the ceiling combination notification process, the players are notified every time the game is played once the total number N of games played reaches a predetermined number of games (game number) that is fewer than the number of games (game number) that causes the lot drawing for the ceiling combination. The notification is given by displaying the table in FIG. 11 on the liquid crystal display 3 to show that the payout corresponding to the ceiling combination can be awarded. Specifically, first a case is considered in which "100" is determined to be the number of games (game number) that causes the lot drawing for the ceiling combination. In this case, the table in FIG. 11 is displayed on the liquid crystal display 3 every time the game is played at ten games prior to this number; i.e., once the total number N of games played reaches 90, which is "10" less than "100." Next, a case is considered in which "500" is determined to be the number of games (game number) that causes the lot drawing for the ceiling combination. In this case, the table in FIG. 11 is displayed on the liquid crystal display 3 every time the game is played at thirty games prior to this number; i.e., once the total number N of games played reaches 470, which is "30" less than "500." Also, a case is considered in which "1000" is determined to be the number of games (game number) that causes the lot drawing for the ceiling combination. In this case, the table in FIG. 11 is displayed on the liquid crystal display 3 every time the game is played at fifty games prior to this number; i.e., once the total number N of games played reaches 950, which is "50" less than "1000."

The process then returns to the main process program in FIG. 7, and proceeds to the lot drawing process in S12.

The following is an explanation of the lottery process program conducted in the slot machine 1, made with reference to FIG. 9. FIG. 9 is a flowchart of the lottery process program. Lots are drawn in S12 of the main process program in FIG. 7. First, the process advances to S31 in FIG. 9 and a symbol determination process is conducted. During the game (S42 in FIG. 10), the symbols statically displayed on the activated pay line L are determined for each of the variable display parts 22, 23, and 24. Specifically, three random numbers are sampled from a range of 0 to 127 by the random number sampling circuit 56 so as to correspond with each of the variable display parts 22, 23, and 24, as described above. The statically displayed symbols are then determined via the code numbers on the basis of the lottery table in FIG. 5. When the symbols to be statically displayed on the activated pay line L are determined, a winning combination determination process is conducted in S32. Specifically, the prize winning combination and payout are determined in this combination determination process via the code numbers in S31 on the basis of the table in FIG. 6, as described above. The process then returns to the main process program in FIG. 7, and proceeds to the game process in S13.

The following is an explanation of the game process program executed in the slot machine 1, made with reference to FIG. 10. FIG. 10 is a flowchart of the game process program. The game process is performed in S13 of the main process program shown in FIG. 7. To achieve this object, a rotation process must first be performed according to S41 of FIG. 10. Specifically, the reels 220 on the back sides of the variable display parts 22, 23, and 24 begin to rotate in the rotation process on the basis of the switch signals output from the spin (SPIN/REPEAT BET) switch 58, 1-BET switch 59, 3-BET switch 60, and 5-BET switch 61. These signals are received in S11 in FIG. 7.

The arrays of symbols 241, 242, and 243 formed on the peripheries of the reels 220 are thereby variably displayed via the variable display parts 22, 23, and 24, whereby the symbols are variably displayed.

In S42, a static control process is conducted. Specifically, the reels 220 on the back sides of the variable display parts 22, 23, and 24 are caused to stop rotating in the static control process, whereby the arrays of symbols 241, 242, and 243 formed on the peripheries of the reels 220 are stopped, and the symbols are statically displayed.

In S43, coins or the like equivalent to the predetermined payout are paid out according to the symbol combination for the prize winning combination statically displayed on the variable display parts 22, 23, and 24 in S42, on the basis of the table in FIG. 6.

In S44, a determination is made as to whether the ceiling combination has been reached. It is determined in this case whether or not the total number N of games played, as computed in S26 in FIG. 8, is equal to or greater than the number of games (game number) causing the lot drawing for the ceiling combination as determined in S25 in FIG. 8. The process proceeds to S47 if it is determined that the ceiling combination has not been reached (S44: NO). The process proceeds to S44 if it is determined that the ceiling combination has been reached (S44: YES).

In S44, a determination is made as to whether the ceiling combination is awarded. In this determination, a random number selected from a range of 0 to 15 is first sampled by the random number sampling circuit 56, and the determination is made based on the random number and the lottery table in FIG. 13. Therefore, if the total number N of games played as computed in S26 in FIG. 8 coincides with the number of games (game number) that causes the lot drawing for the ceiling combination, then it is determined that the ceiling combination will be awarded only when the random number is "0" (with an award probability of 1/16). If the total number N of games played as computed in S26 in FIG. 8 is greater by a difference of from "1" or greater to "50" or less than the number of games (game number) causing the lot drawing for the ceiling combination as determined in S25 in FIG. 8, then it is determined that the ceiling combination will be awarded only when the random number is "0" or "1" (with an award probability of 2/16). If the total number N of games played as computed in S26 in FIG. 8 is greater by a difference of from "51" or greater to "100" or less than the number of games (game number) causing the lot drawing for the ceiling combination as determined in S25 in FIG. 8, then it is determined that the ceiling combination will be awarded only when the random number is "0," "1," or "2" (with an award probability of 3/16). If the total number N of games played as computed in S26 in FIG. 8 is greater by a difference of from "101" or greater to "200" or less than the number of games (game number) causing the lot drawing for the ceiling combination as determined in S25 in FIG. 8, then it is determined that the ceiling combination will be awarded only when the random number is "0," "1," "2," or "3" (with an award probability of 4/16). If the total number N of games played as computed in S26 in FIG. 8 is greater by a difference of "201" or greater than the number of games (game number) causing the lot drawing for the ceiling combination as determined in S25 in FIG. 8, then it is determined that the ceiling combination will be awarded only when the random number is "0," "1," "2," "3," or "4" (with an award probability of 5/16). The lottery table shown in FIG. 13 is stored in the ROM 51.

In S44-2, the process proceeds to S47 if it is determined that the ceiling combination is not awarded (S44-2: NO). Coins or the like (e.g., 500) equivalent to the predetermined payout are paid out in S45 on the basis of the table in FIG. 11 if it is determined that the ceiling combination is awarded (S44-2: YES). Furthermore, "0" is substituted as the total number N of games played and the number is reset in S46, after which the process proceeds to S47.

In S47, it is determined whether or not the jackpot will be awarded. It is determined in this case that the jackpot is awarded only when "0" is the random number sampled by the random number sampling circuit 56 from a range of 0 to 1023 in S47. Another possibility is to instead determine that the jackpot is awarded only when the number combination "7-7-7" occurs in S12 in FIG. 7, for example.

In S47, the main process program in FIG. 7 ends if it is determined that the jackpot is not won (S47: NO), and a new main process program in FIG. 7 is started. Coins or the like equivalent to the progressive jackpot that has accumulated thus far are paid out in S48 if it is determined that the jackpot is won (S47: YES). Furthermore, the number "0" is substituted for the progressive jackpot such that the jackpot is reset in the jackpot initialization process in S49. The main process program in FIG. 7 then ends, and a new main process program in FIG. 7 is again started.

Although the jackpot is reset as described above, the game number N may be retained such that the ceiling combination may be won even immediately after the progressive jackpot is awarded to one of the other players. Therefore, the player may have incentive to continue to play the game even after the progress jackpot is awarded.

Therefore, the CPU 50 functions as "lot drawing means" (or "lottery means") when S12 in FIG. 7 is executed.

The CPU 50 also functions as "static display control means" (or "stop-display control means") when S42 in FIG. 10 is executed.

The CPU 50 also functions as "jackpot control means" when S48 in FIG. 10 is executed.

The CPU 50 also functions as "ceiling combination drawing means" when S25 in FIG. 8 is executed.

The CPU 50 also functions as "ceiling combination re-drawing means" when S44-2 in FIG. 10 is executed.

The CPU 50 also functions as "ceiling combination payout means" when S45 in FIG. 10 is executed.

The CPU 50 also functions as "reset means" when S46 in FIG. 10 is executed.

The CPU 50 also functions as "notification means" when S28 in FIG. 8 is executed.

As described in detail above, some of the coins (and their equivalent value) used for betting are added to the progressive jackpot in the slot machine 1 of the present embodiment (S27). Coins or the like (e.g., 10,000) equivalent to the progressive jackpot that has accumulated thus far are then paid out (S48) if it is determined that the jackpot is awarded (S47: YES). The jackpot is awarded only in cases in which "0" is the random number sampled from a range of 0 to 1023 by the random number sampling circuit 56. Therefore, since the probability that the jackpot will be awarded is relatively low at 1/1023, the progressive jackpot is often very large, and the player can enjoy gambling to the fullest. However, the player is rarely fortunate enough to acquire the progressive jackpot even when continuing to play the slot game in hopes of winning the jackpot. Therefore, players often give up attempting to win the progressive jackpot at the beginning.

However, in the slot machine 1 of the present embodiment, a number of games (game number) that causes the lot drawing for the ceiling combination is determined (S25) from among three numbers of games that causes the lot drawing for the ceiling combination ("100," "500," and "1000"). This result is achieved by drawing lots based on the table in FIG. 11 and on a random number sampled from a range of 0 to 127 by the random number sampling circuit 56. If the total number N of games played coincides with the determined number of games (game number) that causes the lot drawing for the ceiling combination (S44: YES), then lots are drawn for each game by using the table in FIG. 13 and the random number sampled from a range of 0 to 15 by the random number sampling circuit 56. Coins or the like are paid out equivalent to a predetermined payout (for the ceiling combination) (S45) if this lot drawing determines that the ceiling combination is won (S44-2: YES). Accordingly, the probability to win the ceiling combination is relatively high at 1/16 to 5/16 once the total number N of games played reaches the determined ceiling combination. It is therefore certain that the player will be awarded for the ceiling combination if the player continues to play the slot game in hopes of winning the ceiling combination. Accordingly, the player may give up attempting to win the progressive jackpot, which is an accumulation of some of the coins (and their equivalent value) betted in each game, but the desire to continue the slot game can be sufficiently instilled in the player.

The payout for the ceiling combination may be set to the same values as shown in FIG. 11, irrespective of the number of games (game number) that causes the lot drawing for the ceiling combination. The payouts may also be set to different values according to the number of games (game number) that causes the lot drawing for the ceiling combination.

In the slot machine 1 of the present embodiment, the player or the like is notified that a payout corresponding to the ceiling combination can be obtained once the total number N of games played reaches a predetermined number of games (game number) that is smaller than the number determined to be the number of games (game number) that causes the lot drawing for the ceiling combination. This notification is made by having the table or the like shown in FIG. 11 displayed on the liquid crystal display 3 each time the game is played (S28). Therefore, it becomes clear to the player that there is a relatively high probability to win the ceiling combination when the table or the like shown in FIG. 11 is displayed on the liquid crystal display 3. Because of this, and also because an indicator for awarding the ceiling combination is provided, the player can be instilled with a sufficient desire to continue playing the slot game.

In the above, an example is given for a notification effect according to the number of games (game number) that causes the lot drawing for the ceiling combination, but the notification effect is not limited thereto. For example, in the case where the table or the like shown in FIG. 11 is to be displayed, the difference between the current total game number N and the game number that causes the lot drawing for the ceiling combination may actually be displayed each time when the game is played.

As described above, the notification effect may be started from in the game of a specific game number that is less, by a predetermined number, than the game number to cause the lot drawing for the ceiling combination. The predetermined number is, for example, from 1 to 10% of the game number to cause the lot drawing. The predetermined number may be smaller, but the percentage of the game number to cause the lot drawing may be larger, when the game number to cause the lot drawing is smaller.

The present invention is not limited to the embodiment described above, and various modifications can be made within a range that does not deviate from the scope thereof.

For example, the single table shown in FIG. 11 is used in the slot machine 1 of the present embodiment when the number of games (game number) causing the lot drawing for the ceiling combination is determined (S25). The table has three numbers of games that causes the lot drawing for the ceiling combination ("100," "500," and "1000"). Another possibility is to include a plurality of tables such as the one shown in FIG. 11 in the ROM 51, as shown in FIG. 12, for example, and to set different combinations of the three numbers of games that cause the lot drawing for the ceiling combination (and the corresponding random numbers and payouts) for the different tables. In this case, one table may first be selected from these tables, and the number of games (game number) causing the lot drawing for the ceiling combination may then be determined based on the selected table. In this case, a table can be used to issue a notification that it is possible to attain a payout that corresponds to the ceiling combination once the total number N of games played has reached the number determined to be the number of games (game number) that causes the lot drawing for the ceiling combination, and a plurality of such tables may also be included in the image ROM 82, so as to correspond with the tables shown in FIG. 12.

In the slot machine 1 according to the present embodiment, the total number N of games played is displayed on the liquid crystal display 3 when the help button 8 is pressed during the game. It is not necessary, however, that the total number N of games played be displayed. In this case, the player, being unable to know the total number N of games played, receives the impression that coins or the like equivalent to the payout of the ceiling combination will suddenly be paid out. Therefore, the player expects a sudden payout of coins or the like, and the desire to continue playing the slot game can be sufficiently instilled in the player.

In the slot machine 1 according to the present embodiment, the number determined to be the number of games (game number) that causes the lot drawing for the ceiling combination is made to correspond to the total number N of games played. However, another possibility instead is for this number to correspond with (the values of) a specified type of progressive jackpot, such as "1111," "2222," . . . , "9999;" or "1000," "2000," . . . , "9000." In this case, the amount paid out as the ceiling combination is subtracted from the progressive jackpot.

In the slot machine 1 according to the present embodiment, the symbols to be statically displayed on the activated pay line L are determined in the lot drawing process in S12 for each of the variable display parts 22, 23, and 24 according to a random number sampled by the random number sampling circuit 56, as shown in FIGS. 5 and 6. Another possibility, however, is for all of the symbols statically displayed on the activated pay line L in each of the variable display parts 22, 23, and 24 to be determined according to a random number sampled by the random number sampling circuit 56. The lottery table of prize winning combinations shown in FIG. 14 is used for this purpose. FIG. 14 is an explanatory diagram showing the lottery table of prize winning combinations and the corresponding payouts.

In FIG. 14, the numbers "7-7-7" are awarded and a payout of "100" is obtained in cases in which the range of random numbers used in the lottery table of prize winning combinations is 0 to 1270, and the random number sampled by the random number sampling circuit 56 is in a range of 0 to 22. The payouts of "5," "3," "2," and "1" are similarly made based on the table shown in FIG. 14.

A "miss" is awarded in cases in which the sampled random number is in a range of 248 to 1270. In such cases, combinations of symbols other than those described above are statically displayed on the activated pay line L in the variable display parts 22, 23, and 24, and no payout is given.

Only standard games are played in the slot machine 1 according to the present embodiment, but after a standard game is played, another possibility is for a free game to be played immediately after S13 in FIG. 7. Such free games generally are often beneficial to the player, and when, for example, the machine goes into free game mode with specified symbols being statically displayed as a condition, the game may be played without betting any coins or the like after 10, 20, or 30 games in accordance with the rank of the free game. At this time, it is common in free games for the probability of various prize winning combinations to be high, and the players therefore often acquire large numbers of coins or the like.

In the slot machine 1 according to the present embodiment, coins or the like equivalent to a predetermined payout are paid out on the basis of the table in FIG. 11 (S45) when it is determined that the ceiling combination is awarded (S44-2: YES). Another possibility is for a predetermined continuous number of free games to be played as the payout, instead of coins or the like being paid out.

Also, the slot machine 1 according to the present embodiment is a mechanical reel machine wherein symbols provided on the side surfaces of rotatably and statically controlled reels 220 are variably and statically displayed through variable display parts 22 to 24. However, another possibility is a video reel machine wherein the symbols are variably and statically displayed on the variable display parts 22 to 24 with video images.

Figure 15:
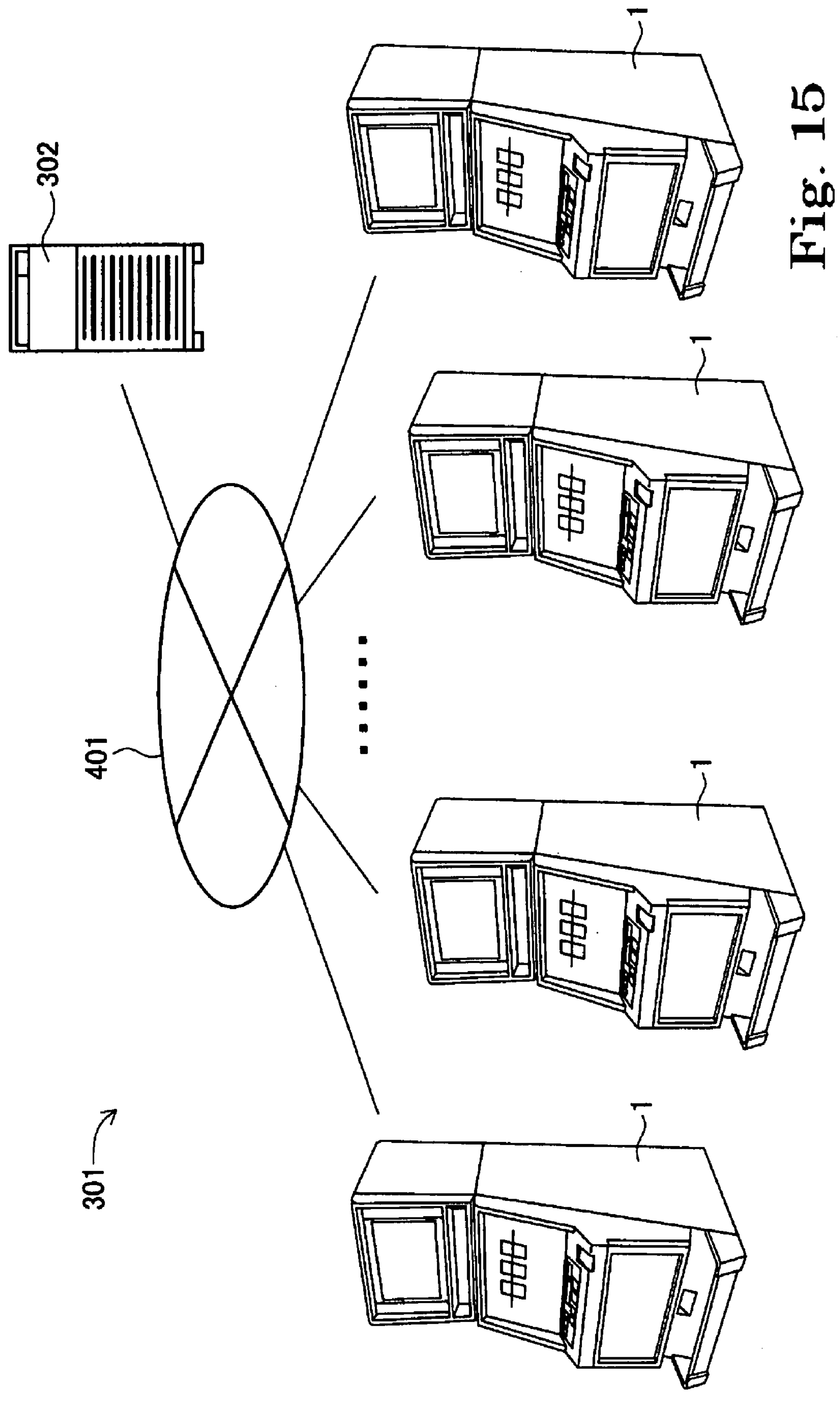
FIG. 15 is a block diagram showing a slot system.
Figure 16:
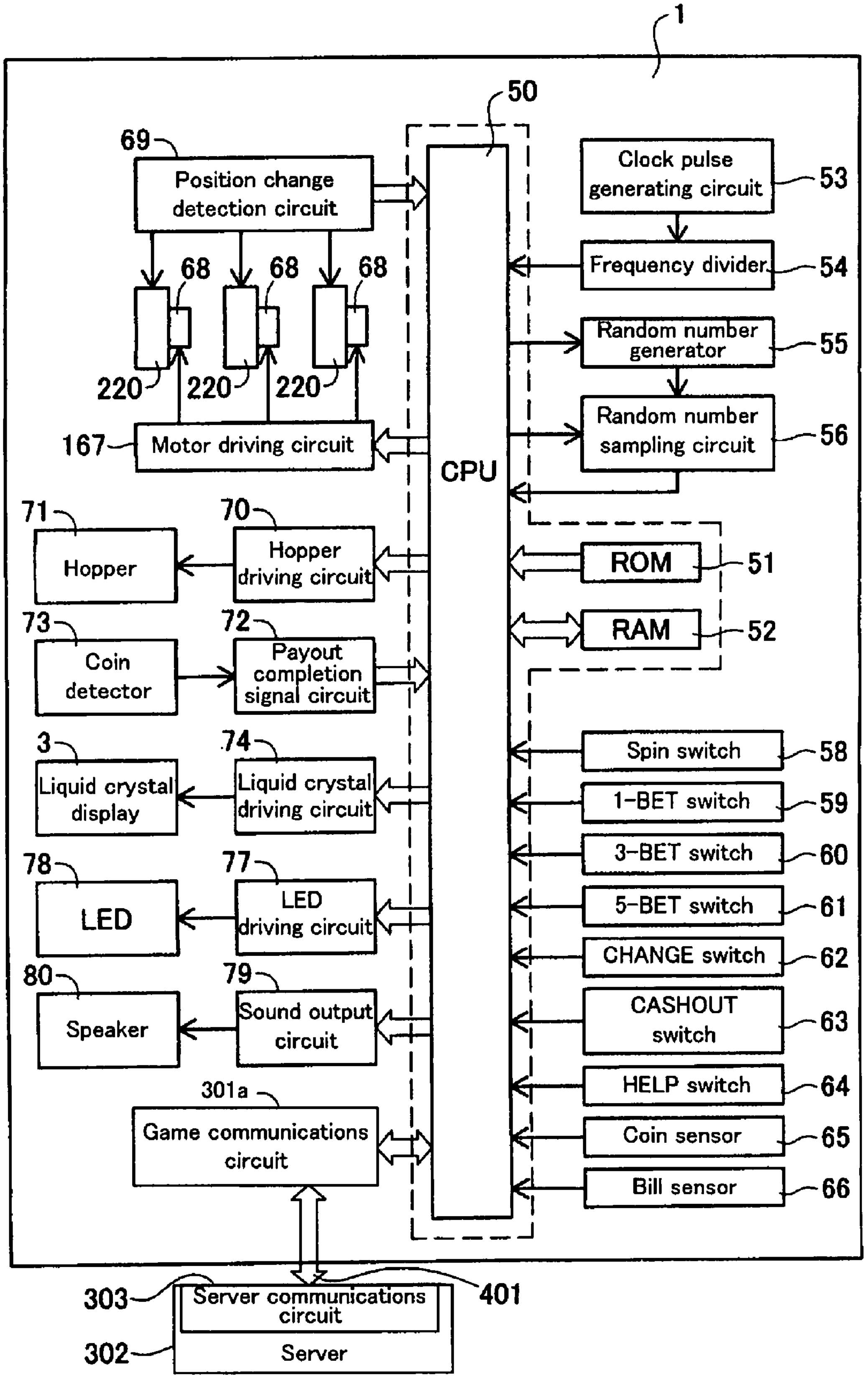
FIG. 16 is a block diagram showing schematically a control system of the slot machines constituting the slot system.
Figure 17:
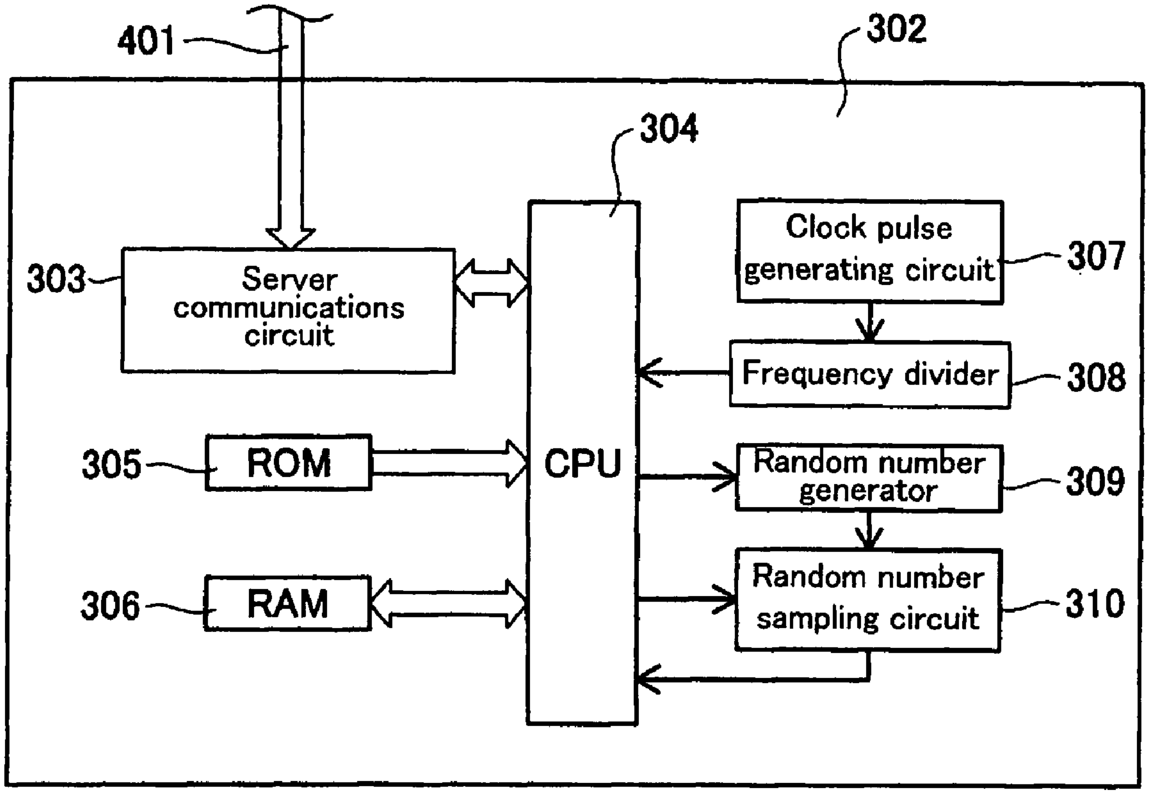
FIG. 17 is a block diagram showing schematically a control system of a server constituting the slot system.

Next, the game system according to the present invention will be described in detail with reference to the drawings, on the basis of embodiments in which the present invention is implemented as a slot system. First, the schematic configuration of the slot system according to the present embodiment will be described on the basis of FIGS. 15 to 17. FIG. 15 is a system block diagram depicting a slot system according to the present embodiment. FIG. 16 is a block diagram schematically depicting the control system of a slot machine as part of the slot system according to the present embodiment. FIG. 17 is a block diagram schematically depicting the control system of a server as part of the slot system according to the present embodiment.

Each of the slot machines constituting the slot system according to the present embodiment has the same configuration as the slot machine 1 shown in FIGS. 1, 2, and other drawings described above. In view of this, the same symbols are used to denote similar components, and explanations thereof are omitted. The slot machine itself is denoted by the same symbol "1," which is used in the following explanation.

In the slot system 301 according to the present embodiment, a server 302 and a plurality of slot machines 1 are connected via a two-way communication network 401, as shown in FIG. 15.

In these slot machines 1, a game communications circuit **301*a* is connected to the CPU 50, as shown in FIG. 16. The game communications circuit 301*a* converts the signals sent out by the slot machines 1 into signals that can be transmitted by a phone circuit, a LAN cable, or another such communications system, and transmits these signals to the server 302. The game communications circuit 301*a* also receives the signals transmitted from the server 302 and converts these signals back to signals that can be read by the slot machines 1. The game communications circuit 301*a* is connected with the server communications circuit 303 of the server 302 via the Internet or another such two-way communication network 401**.

The control system of the server 302 is specifically configured with a CPU 304 as a core element, and a ROM 305 and a RAM 306 are connected to the CPU 304, as shown in FIG. 17. The ROM 305 stores a jackpot/ceiling combination execution process program (described hereinbelow); the table that is shown in FIG. 11 and that includes a lottery table of the number of games (game number) that causes the lot drawing for the ceiling combination, and a payout table for the ceiling combination and the notifying presentation; various programs needed to control the server 302; a data table; and the like. The RAM 306 is memory for temporarily storing various type of data computed by the CPU 304.

A clock pulse generating circuit 307 for generating a reference clock pulse, and a frequency divider 308 are also connected to the CPU 304, as are a random number generator 309 for generating random numbers, and a random number sampling circuit 310. Random numbers sampled by the random number sampling circuit 310 are used in the jackpot, the ceiling combination, and other various lotteries.

The server communications circuit 303 is also connected to the CPU 304. The server communications circuit 303 converts signals sent out by the server 302 into signals that can be transmitted by a phone circuit, a LAN cable, or another such communications system, and transmits these signals to the slot machines 1. The server communications circuit 303 also receives signals transmitted from the slot machines 1 and converts these signals back to signals that can be read by the server 302. The server communications circuit 303 is connected with the game communications circuit **301*a* of the slot machines 1 via the Internet or another such two-way communication network 401**.

Figure 18:
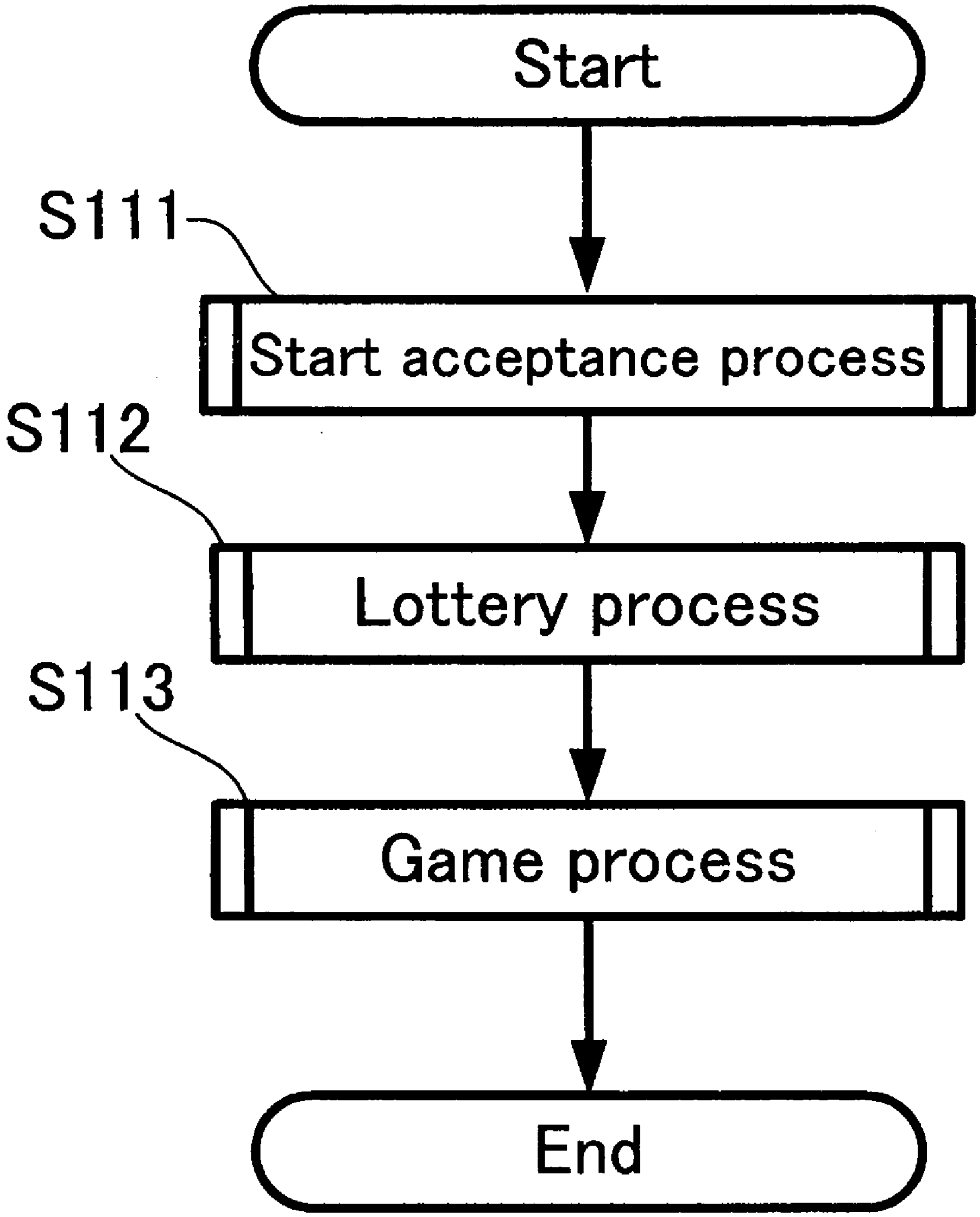
FIG. 18 is a flow chart of a main process program to be executed in each slot machine of the slot system.

The following is an explanation of the main process program executed in the slot machines 1 of the slot system 301, in reference to FIG. 18. FIG. 18 is a flowchart of the main process program. The processes in S111 to S113 in FIG. 18 are identical to the processes in S11 to S13 in FIG. 7, and explanations thereof are therefore omitted.

Figure 19:
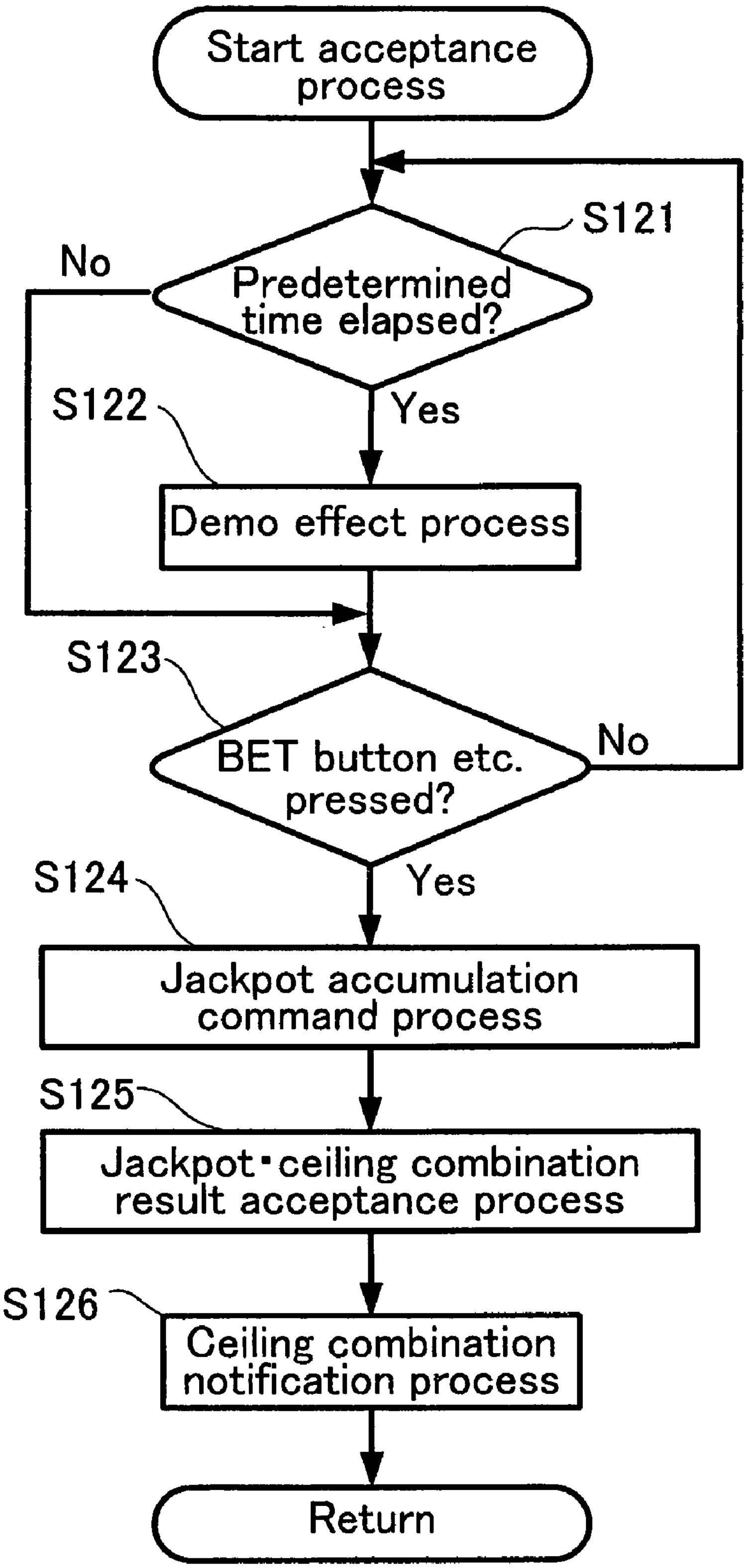
FIG. 19 is a flow chart of a start acceptance process program to be executed in each slot machine of the slot system.

The following is an explanation of the start acceptance process program executed in the slot machines 1 of the slot system 301, in reference to FIG. 19. FIG. 19 is a flowchart of the start acceptance process program. The start acceptance process is performed in S111 of the main process program shown in FIG. 18. To achieve this object, the processes in S121 to S123 in FIG. 18 are first performed in sequence. The processes in S121 to S123 are identical to the processes in S21 to S23 in FIG. 8, and explanations thereof are therefore omitted.

Therefore, when the help button 8 is pressed during the game, the total game number N, which is the number of games having been played so far, is displayed on the liquid crystal display 3. The total game number N herein is the sum total of the number of games having been played in all the slot machines 1 of the slot system 301, and the number of the sum total is totaled (or calculated) by the server 302. Accordingly, when the help button 8 is pressed during the game, the liquid crystal display 3 displays the total number N of games played (the sum total of the number of games played in the slot machines 1 of the slot system 301) that has most recently been received from the server 302 at that point.

When the process proceeds to S124, a jackpot accumulation command process is performed. A command (including information about the amount of bet coins for betting) to add a part of the bet coins (or the equivalent value thereto) for betting in the slot machine 1 to the progressive jackpot, as well as individual information of the slot machine 1, is transmitted to the server 302, and then the process proceeds to S125.

In S125, the jackpot/ceiling combination result is accepted, and information to the effect that the jackpot or a ceiling combination has been awarded is received from the server 302. Also received from the server are (the value of) the progressive jackpot, the total game number N, the game number that causes the lot drawing for the ceiling combination, and the like.

In S126, a ceiling combination notification process is performed. In the ceiling combination notification process, once the total number N of games played (or the total game number N) reaches a predetermined number of games (or a predetermined game number) that is smaller than the game number that causes the lot drawing for the ceiling combination, each player is notified every time when the game is played that the payout amount corresponding to the ceiling combination can be awarded. The notification is made by displaying the table as shown in FIG. 11 on the liquid crystal display 3. Specifically, first a case is considered in which "100" is determined to be the game number that causes the lot drawing for the ceiling combination. In this case, the table in FIG. 11 is displayed on the liquid crystal display 3 every time when the game of the predetermined game number is played where the predetermined game number is smaller by "10" than the determined game number that causes the lot drawing, i.e., once the total game number N reaches 90, which is "10" less than "100." Next, a case is considered in which "500" is determined to be the number of games (game number) that causes the lot drawing for the ceiling combination. In this case, the table in FIG. 11 is displayed on the liquid crystal display 3 every time when the game of the predetermined game number is played where the predetermined game number is smaller by "30" than the determined game number that causes the lot drawing, i.e., once the total game number N reaches 470, which is "30" less than "500." Also, a case is considered in which "1000" is determined to be the number of games (game number) that causes the lot drawing for the ceiling combination. In this case, the table in FIG. 11 is displayed on the liquid crystal display 3 every time when the game of the predetermined game number is played where the predetermined game number is smaller by "30" than the determined game number that causes the lot drawing, i.e., once the total game number N reaches 950, which is "50" less than "1000."

As described above, the notification is started by the predetermined game number earlier than the determined game number that causes the lot drawing to determine whether the ceiling combination is won or not. The predetermined game number is larger if the determined game number is larger whereas a ratio thereof to the predetermined game number is smaller. For example, when the determined game number is 100, the predetermined game number is 10 to yield 10% of the determined game number. And when the determined game number is 500, the predetermined game number is 30 to yield 6% of the determined game number. Further, when the determined game number is 1000, the predetermined game number is 50 to yield 5% of the determined game number.

In the gaming system, the total game number N is commonly shared with the gaming machines in the system in which the progressive jackpot is shared. Therefore, a specific player playing with a specific gaming machine 1 may be notified in the first game the specific player plays since the other players have already contributed to the total game number N. On the other hand, when one player wins the ceiling combination and the total game number N is reset, the other players will realize the notification is suddenly stopped even though the other players have not won the ceiling combination. Therefore, all the players are encouraged to repeat the games as fast as possible such that they may have more opportunities to win the ceiling combination. If the winning probability is set higher as the total game number is incremented more and more, the players are even more encouraged to repeat the games at the top speed.

The process then returns to the main process program in FIG. 18, and proceeds to the lot drawing process in S112.

Figure 20:
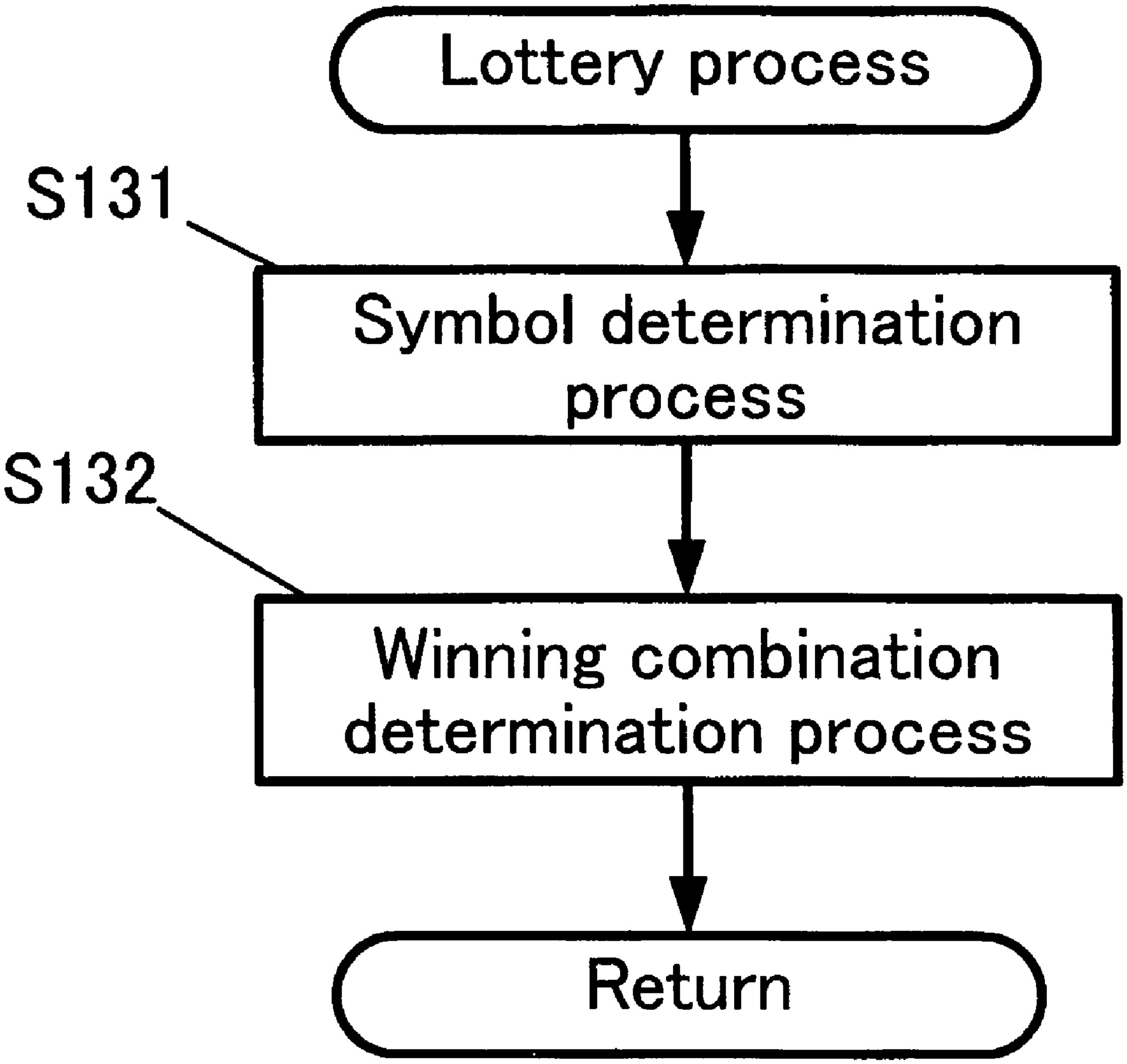
FIG. 20 is a flow chart of a lottery process program to be executed in each slot machine of the slot system.

The following is an explanation of the lottery process program conducted in the slot machines 1 of the slot system 301, made with reference to FIG. 20. FIG. 20 is a flowchart of the lottery process program. The lottery process is conducted in S112 of the main process program in FIG. 18. The processes in S131 and S132 in FIG. 20 are first conducted in sequence at this time. The processes in S131 and S132 are identical to the processes in S31 and S32 in FIG. 9, and explanations thereof are therefore omitted.

Figure 21:
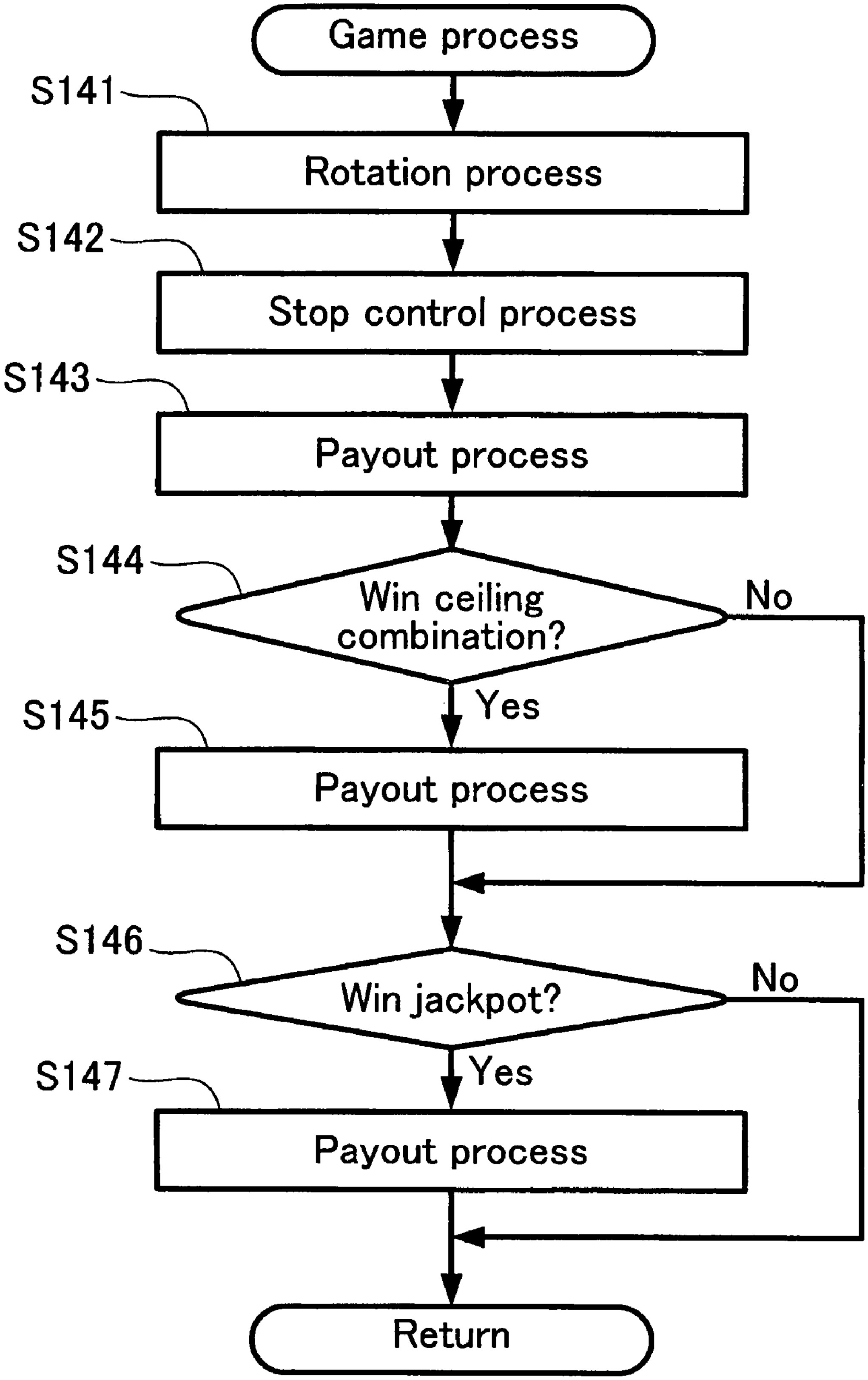
FIG. 21 is a flow chart of a game process program to be executed in each slot machine of the slot system.

The following is an explanation of the game process program executed in the slot machines 1 of the slot system 301, made with reference to FIG. 21. FIG. 21 is a flowchart of the game process program. The game process is performed in S113 of the main process program shown in FIG. 18. The processes in S141 to S143 in FIG. 21 are first conducted in sequence at this time. The processes in S141 to S143 are identical to the processes in S41 to S43 in FIG. 10, and explanations thereof are therefore omitted.

In S144, a determination is made as to whether the ceiling combination has been awarded. This determination is made based on whether or not information to the effect that the ceiling combination has been awarded has been received from the server 302 in S125 in FIG. 19. The process proceeds to S146 if it is determined that the ceiling combination has not been awarded (S144: NO). Coins or the like (e.g., 500) equivalent to a predetermined payout are paid out on the basis of the table in FIG. 11 in S145, and the process proceeds to S146, if it is determined that the ceiling combination has been awarded (S144: YES).

In S146, a determination is made as to whether the jackpot has been awarded. This determination is made based on whether or not information to the effect that the jackpot has been awarded has been received from the server 302 in S125 in FIG. 19. Another possibility is to instead determine that the jackpot is awarded only when the number combination "7-7-7" is awarded in S112 in FIG. 18, for example.

The main process program in FIG. 18 is ended, and a new main process program in FIG. 18 is begun if it is determined in S146 that the jackpot has not been awarded (S146: NO). Coins or the like equivalent to (the value of) the progressive jackpot received from the server 302 in S125 of FIG. 19 are paid out in S147 if it is determined that the jackpot has been awarded (S146: YES). Then, the main process program in FIG. 18 is ended, and a new main process program in FIG. 18 is begun.

Figure 22:
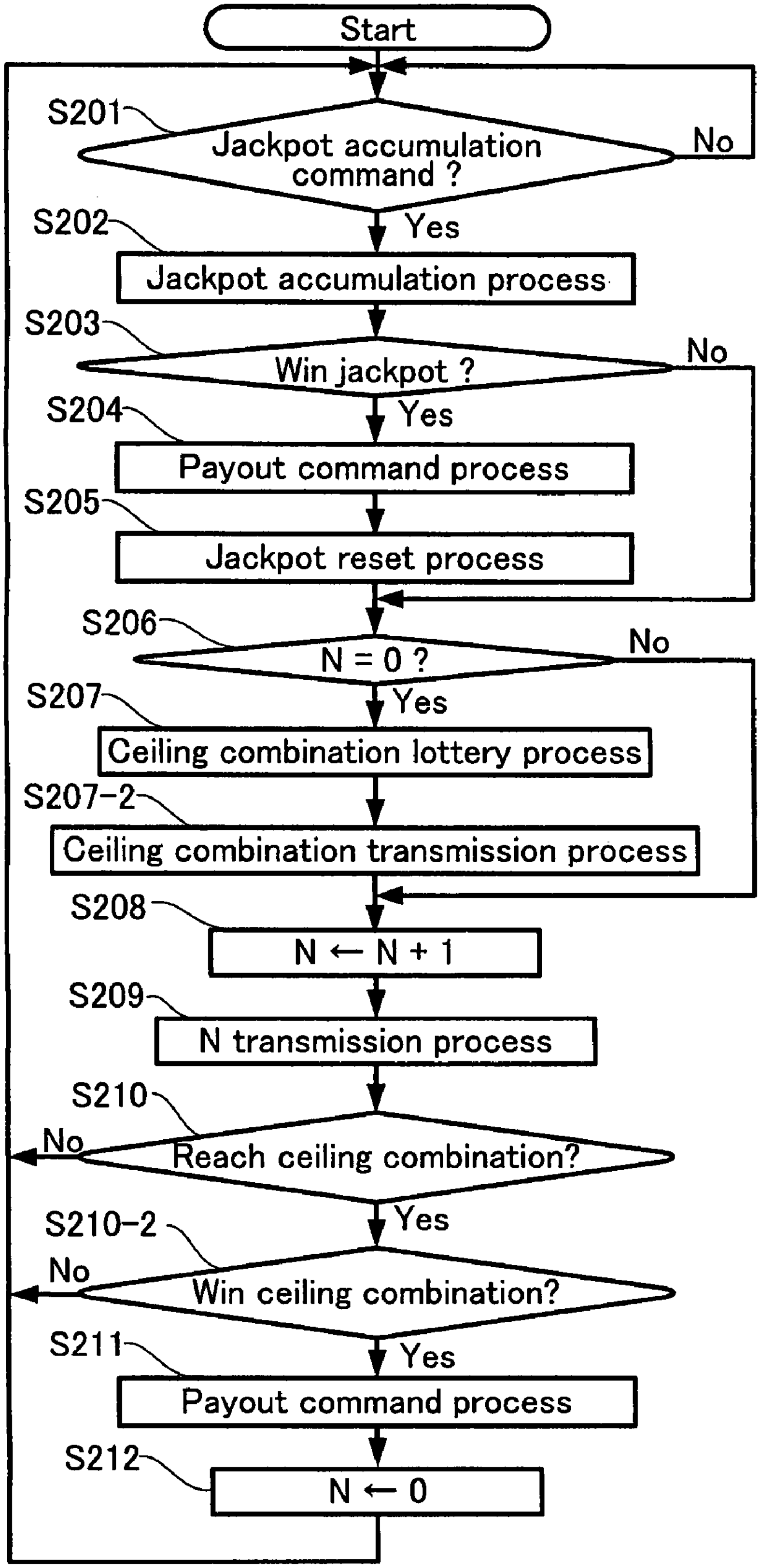
FIG. 22 is a flow chart of a jackpot/ceiling combination lottery process program to be executed in the server of the slot system.

The following is an explanation of the jackpot/ceiling combination lottery process program executed by the server 302 of the slot system 301, made with reference to FIG. 22. FIG. 22 is a flowchart of the jackpot/ceiling combination lottery process program. In FIG. 22, first, in S201, a determination is made as to whether there is jackpot accumulation instruction. This determination is made according to whether or not a command (including information on the amount of coins used for betting) has been received. This command is transmitted in S124 in FIG. 19 from any of the slot machines 1, and the effect of the command is that some of the coins (and the equivalent value) used for betting are added to the progressive jackpot.

If it is determined that there is no jackpot accumulation instruction (S201: NO), then the process returns to S201 as such and waits in standby until there is a jackpot accumulation instruction. When it is determined that there is a jackpot accumulation instruction (S201: YES), then the process advances to the jackpot accumulation process in S202, and some of (the equivalent value of) the coins used for betting as received in S201 are added to the progressive jackpot. A memory area is reserved in the RAM 306 for the progressive jackpot.

In S203, a determination is made as to whether the jackpot has been awarded. It is determined that the jackpot has been awarded only when the random number sampled from a range of 0 to 1023 by the random number sampling circuit 310 in S203 is "0." The process proceeds to S206 if it is determined that the jackpot has not been awarded (S203: NO). If it is determined that the jackpot has been awarded (S203: YES), then both information to the effect that the jackpot has been awarded and (the value of) the progressive jackpot that has accumulated up to this point are transmitted in the payout instruction process in S204 to the slot machine 1, which is the source of the command received in S201. Furthermore, the progressive jackpot is reset by substituting the value "0" in the jackpot initialization process in S205.

The process then proceeds to S206, and a determination is made as to whether the total number N of games played is "0." The process proceeds to S208 if it is determined that the total number N of games played is not "0" (S206: NO). The ceiling combination lottery process in S207 (described hereinbelow) is performed, and the process then proceeds to S208, if it is determined that the total number N of games played is "0" (S206: YES).

The ceiling combination lottery process in S207 will now be described. In the ceiling combination lottery process in S207, the random number sampling circuit 310 samples a random number from a range of 0 to 127, and the ceiling combination is determined from the table in FIG. 11. Specifically, "100" is determined to be the number of games (game number) that causes the lot drawing for the ceiling combination if the random number sampled by the random number sampling circuit 310 is in a range of 0 to 25 at this time. "500" is determined to be the number of games (game number) that causes the lot drawing for the ceiling combination if the random number sampled by the random number sampling circuit 310 is in a range of 26 to 63. "1000" is determined to be the number of games (game number) that causes the lot drawing for the ceiling combination if the random number sampled by the random number sampling circuit 310 is in a range of 64 to 127.

The term "ceiling combination" refers to the winning combination whereby a determination is made by lot drawing for each game as to whether the payout is awarded. The lot drawing begins once the total number N of games played reaches the number determined to be the number of games (game number) that causes the lot drawing for the ceiling combination. The lot drawing then continues until the payout that corresponds to the ceiling combination is awarded. Referring to FIG. 11, a case is considered in which the number "100" is determined to be the number of games (game number) that causes the lot drawing for the ceiling combination. In this case, once the total number N of games played has reached "100," a determination is made by lot drawing for each game as to whether the payout of "500" will be awarded, as corresponds to the number of games (game number) that causes the lot drawing for the ceiling combination. Next, a case is considered in which the number "500" is determined to be the number of games (game number) that causes the lot drawing for the ceiling combination. In this case, once the total number N of games played has reached "500," a determination is made by lot drawing for each game as to whether the payout of "500" will be awarded, as corresponds to the number of games (game number) that causes the lot drawing for the ceiling combination. Next, a case is considered in which the number "1000" is determined to be the number of games (game number) that causes the lot drawing for the ceiling combination. In this case, once the total number N of games played has reached "1000," a determination is made by lot drawing for each game as to whether the payout of "500" will be awarded, as corresponds to the number of games (game number) that causes the lot drawing for the ceiling combination.

The total number N of games played is the sum total of the number of games (game number) played in the slot machines 1 of the slot system 301, as described above. Therefore, it is possible for a payout of the ceiling combination will be attained in slot machines 1 in which the total number N of games played is "100," "500," or "1000," as counted by the server 302. The table in FIG. 11 is stored in the ROM 305, and a memory area is reserved in the RAM 306 for the total number N of games played.

In S207-2, the number of games (game number) causing the lot drawing for the ceiling combination as determined in S207 is transmitted to the slot machine 1, which is the source of the command received in S201.

In S208, the current total number N of games played is computed by adding "1" to the existing total number N of games played. Furthermore, in S209, the current total number N of games played is transmitted to the slot machine 1, which is the source of the command received in S201.

In S210, a determination is made as to whether or not the ceiling combination has been reached. This determination is made based on whether or not the total number N of games played as computed in S208 is equal to or greater than the number of games (game number) causing the lot drawing for the ceiling combination as determined in S207. The process returns to S201 and repeats the process described above if it is determined that the ceiling combination has not been reached (S210: NO). The process advances to S210-2 if it is determined that the ceiling combination has been reached (S210: YES).

In S210-2, a determination is made as to whether the ceiling combination has been awarded. A random number is first sampled from a range of 0 to 15 by the random number sampling circuit 56, and then the determination is made based on this random number and on the lottery table shown in FIG. 13.

The lottery table shown in FIG. 13 is identical to the table described above, except for the lottery table being stored in the ROM 305.

The process returns to S201 and repeats the process described above if it is determined in S210-2 that the ceiling combination has not been awarded (S210-2: NO). If it is determined that the ceiling combination has been awarded (S210-2: YES), then information to the effect that the ceiling combination has been awarded is transmitted in the payout instruction process in S211 to the slot machine 1, which is the source of the command received in S201, and the total number N of games played is reset in S212 by substituting the number "0." The process then returns to S201 and repeats the process described above.

Therefore, the CPU 50 of the slot machines 1 functions as "lottery means" when S112 in FIG. 18 is executed.

The CPU 50 of the slot machines 1 also functions as "stop-display control means" when S142 in FIG. 21 is executed.

The CPU 50 of the slot machines 1 also functions as "notification means" when S126 in FIG. 19 is executed.

The CPU 304 of the server 302 also functions as "jackpot control means" when S204 in FIG. 22 is executed.

The CPU 304 of the server 302 also functions as "ceiling combination drawing means" when S207 in FIG. 22 is executed.

The CPU 304 of the server 302 also functions as "ceiling combination re-drawing means" when S210-2 in FIG. 22 is executed.

The CPU 304 of the server 302 also functions as "ceiling combination payout means" when S211 in FIG. 22 is executed.

The CPU 304 of the server 302 also functions as "reset means" when S212 in FIG. 22 is executed.

As described in detail above, in the slot system 301 of the present embodiment, some of the coins (and their equivalent value) used for betting in the slot machines 1 are added to the progressive jackpot (S202) by the server 302. Coins or the like (10,000, for example) equivalent to the progressive jackpot that has accumulated thus far are then paid out in the slot machines 1 (S204, S147) if it is determined that the jackpot has been awarded (S203: YES). The jackpot is awarded only in cases in which "0" is the random number sampled from a range of 0 to 1023 by the random number sampling circuit 310 in the server 302. Therefore, since the probability that the jackpot will be awarded is relatively low at 1/1023, the progressive jackpot is often very large, and the player can enjoy gambling to the fullest. However, the player is rarely fortunate enough to acquire the progressive jackpot even when continuing to play the slot game in hopes of winning the jackpot. Therefore, players often give up attempting to win the progressive jackpot at the beginning.

However, in the slot machine 1 of the present embodiment, a number of games (game number) that causes the lot drawing for the ceiling combination is determined (S207) from among three numbers of games that cause the lot drawing for the ceiling combination ("100," "500," and "1000"). This result is achieved by drawing lots based on the table in FIG. 11 and a random number sampled from a range of 0 to 127 by the random number sampling circuit 56. If the total number N of games played coincides with the determined number of games (game number) that causes the lot drawing for the ceiling combination (S210: YES), then lots are drawn for each game by using the table in FIG. 13 and the random number sampled from a range of 0 to 15 by the random number sampling circuit 56. If this lot drawing determines that the ceiling combination has been awarded (S210-2: YES), then coins or the like are paid out equivalent to a predetermined payout on the basis of the table in FIG. 11 (S211, S145). Accordingly, the probability that the ceiling combination will be awarded is relatively high at 1/16 to 5/16 once the total number N of games played reaches the determined ceiling combination. It is therefore certain that the player will be awarded the ceiling combination if the player continues to play the slot game in hopes of being awarded the ceiling combination. Accordingly, the player may give up attempting to win the progressive jackpot, which is an accumulation of some of the coins (and their equivalent value) betted in each game, but the desire to continue the slot game can be sufficiently instilled in the player.

The payout for the ceiling combinations may be set to the same values as shown in FIG. 11, irrespective of the number of games (game number) that causes the lot drawing for the ceiling combination. The payouts may also be set to different values according to the number of games (game number) that causes the lot drawing for the ceiling combination.

In the slot system 301 of the present embodiment, the player or the like is notified that a payout corresponding to the ceiling combination can be attained once the total number N of games played reaches a predetermined number of games (game number) that is smaller than the number determined to be the number of games (game number) that causes the lot drawing for the ceiling combination. This notification is made by having the table or the like shown in FIG. 11 displayed on the liquid crystal display 3 each time the game is played (S126). Therefore, it becomes clear to the player that there is a relatively high probability that the ceiling combination will be awarded when the table or the like shown in FIG. 11 is displayed on the liquid crystal display 3. Because of this, and also because an indicator for awarding the ceiling combination is provided, the player can be instilled with a sufficient desire to continue playing the slot game.

As described above, an example is given for a notification effect according to the number of games (game number) that causes the lot drawing for the ceiling combination, but the presentation is not limited thereto. For example, when the table or the like shown in FIG. 11 is displayed, another possibility is to have the difference between the current total number N of games played and the number of games (game number) that causes the lot drawing for the ceiling combination to be displayed each time the game is played.

In the slot system 301 of the present embodiment, the total number N of games played as computed by the server 302 is computed from the games played in all the slot machines 1. The total number N of games played reaches "100," "500," and "1000" relatively quickly compared to cases in which the games played in a single slot machine 1 are used in this computation. Therefore, the desire to continue the slot game can be sufficiently instilled in the player.

The present invention is not limited to the embodiment described above, and various modifications can be made within a range that does not deviate from the scope thereof.

For example, the single table shown in FIG. 11 is used in the slot system 301 of the present embodiment when the number of games (game number) causing the lot drawing for the ceiling combination is determined (S207). The table has three numbers of games that cause the lot drawing for the ceiling combination ("100," "500," and "1000"). Another possibility in this matter is to include a plurality of tables such as the one shown in FIG. 11 in the ROM 305 of the server 302, as shown in FIG. 11, for example, and to set different combinations of the three numbers of games that cause the lot drawing for the ceiling combination (and the corresponding random numbers and payouts) for the different tables. In this case, one table may first be selected from these tables, and the number of games (game number) that causes the lot drawing for the ceiling combination may then be determined based on the selected table. In this case, a table may be used to issue a notification that it is possible to attain a payout that corresponds to the ceiling combination once the total number N of games played has reached the number determined to be the number of games (game number) that causes the lot drawing for the ceiling combination, and a plurality of such tables may also be included in the image ROM 82 of the slot machines 1, so as to correspond with the tables shown in FIG. 12.

In the slot system 301 according to the present embodiment, the total number N of games played is displayed on the liquid crystal display 3 when the help button 8 is pressed during the game, in the slot machines 1. It is not necessary, however, that the total number N of games played be displayed. In this case, the player, being unable to know the total number N of games played, receives the impression that coins or the like equivalent to the payout of the ceiling combination will suddenly be paid out. Therefore, the player expects a sudden payout of coins or the like, and the desire to continue playing the slot game can be sufficiently instilled in the player.

In the slot system 301 according to the present embodiment, the number determined to be the number of games (game number) that causes the lot drawing for the ceiling combination is made to correspond to the total number N of games played. However, another possibility instead is for this number to correspond with (the values of) a specified type of progressive jackpot, such as "1111," "2222," . . . , "9999;" or "1000," "2000," . . . , "9000." In this case, the amount paid out as the ceiling combination is subtracted from the progressive jackpot.

In the slot machines 1 of the slot system 301 according to the present embodiment, the symbols to be statically displayed on the activated pay line L are determined in the lot drawing process in S112 for each of the variable display parts 22, 23, and 24 according to a random number sampled by the random number sampling circuit 56, as shown in FIGS. 5 and 6. Another possibility, however, is for all of the symbols statically displayed on the activated pay line L in each of the variable display parts 22, 23, and 24 to be determined according to a random number sampled by the random number sampling circuit 56. The lottery table of prize winning combinations shown in FIG. 14 is used for this purpose, but an explanation of FIG. 14 is omitted, having already been given.

Only standard games are described as being played in the slot machines 1 of the slot system 301 according to the present embodiment. Another possibility is for a free game to be played following a standard game immediately after S113 in FIG. 18. Such free games generally are often beneficial to the player, and when the machine goes, for example, into free game mode with specified symbols being statically displayed as a condition, the game may be played continuously without betting any coins or the like after 10, 20, or 30 games according to the rank of the free game. At this time, is it common in free games for the probability of various prize winning combinations to be high, and the players therefore often acquire large numbers of coins or the like.

In the slot system 301 according to the present embodiment, when it is determined that the ceiling combination is awarded (S210-2: YES), coins or the like equivalent to a predetermined payout are paid out on the basis of the table in FIG. 11 (S211, S143). Another possibility is for a predetermined continuous number of free games to be played as the payout, instead of coins or the like.

Also, the slot machines 1 of the slot system 301 according to the present embodiment are mechanical reel machines wherein symbols provided on the side surfaces of rotatably and statically controlled reels 220 are variably and statically displayed through variable display parts 22 to 24. However, another possibility is a system of video reel machines wherein the symbols are variably and statically displayed on the variable display parts 22 to 24 with video images.

In the slot system 301 according to the present embodiment, whether or not the jackpot or the ceiling combination has been awarded is determined by the server 302 (S203, S210). Another possibility is for the slot machines 1 to individually determine whether or not the ceiling combination has been awarded, including cases in which the total number N of games played is computed. Still another possibility is for the slot machines 1 to individually determine whether the jackpot has been awarded, including cases in which (the value of) the progressive jackpot is computed.

In the slot system 301 according to the present embodiment, part of the system is configured from a server 302 that is different from the slot machine 1, but another possibility is to allot the functions of the server 302 to any of a plurality of slot machines 1, and to remove the server 302 from the system.

INDUSTRIAL APPLICABILITY

The present invention can be applied to gaming technology in which a progressive jackpot system is incorporated.

As described above, the ceiling combination is employed for the explanation of the preferred embodiments according to the present invention. Modifications and alterations may be made on the preferred embodiments within the scope of the embodiments or the present invention. By way of example, a special combination including the ceiling combination may be implemented in accordance with the present invention. The special combination may include the features of the ceiling combination such that the special combination may be won in a lottery or the like, which is triggered when the game number games the specific player has played reaches a predetermined game number. The predetermined game number, however, may be selected from a plurality of game numbers by a lottery or the like at the beginning or the resuming of a series of games by the player. A predetermined award (payout rate or payout amount) is assigned to the special combination in advance or at each time when the predetermined game number is determined. A specific symbol combination may be assigned to the special combination. The other features of the ceiling combination may be assigned to the special combination such that the special combination may apply to any of the aforementioned embodiments.

By way of example, ceiling combination lot drawing means for conducting a lottery to determine a game number for a predetermined ceiling combination from among a plurality of game numbers may be referred to as a special combination lot drawing means for conducting a lottery to determine a game number for a predetermined special combination from among a plurality of game numbers. And ceiling combination lot re-drawing means for conducting a lottery to determine whether or not to provide a predetermined award in each gaming machine for every game played in the each gaming machine after a total game number reaches the game number having been determined by the lottery conducted by the ceiling combination lot drawing means may be referred to as special combination lot re-drawing means for conducting a lottery to determine whether or not to provide a predetermined award in each gaming machine for every game played in the each gaming machine after a total game number reaches the game number having been determined by the lottery conducted by the special combination lot drawing means. And ceiling combination payout means for providing a predetermined award when the ceiling combination is won in the lottery conducted by the ceiling combination lot re-drawing means may be referred to as special combination payout means for providing a predetermined award when the special combination is won in the lottery conducted by the special combination lot re-drawing means. Further, a ceiling award lottery to determine whether or not to provide a predetermined award of the ceiling combination may be referred to as a special award lottery to determine whether or not to provide a predetermined award of the special combination.

Further, a gaming machine and a game system as described below may be provided in accordance with the present invention.

In the present invention, a gaming machine comprises: display means (e.g., each variable display part 22 to 24) for displaying symbols variably and statically upon betting game media; lottery means (e.g., CPU 50, S12) for conducting a lottery to determine a plurality of symbols to be stopped and displayed on the display means (e.g., each variable display part 22 to 24); and static display control means (e.g., CPU 50, S42) for displaying statically the plurality of symbols having been determined by the lottery means (e.g., CPU 50, S12) on the display means (e.g., each variable display part 22 to 24) by terminating the variable display of the symbols on the display means (e.g., each variable display part 22 to 24). The gaming machine (e.g., slot machine 1) provides a payout based on a combination of the selected symbols being displayed statically on the display means (e.g., each variable display part 22 to 24).

The gaming machine further comprises: jackpot control means (e.g., CPU 50, S48) for providing an amount of a progressive jackpot cumulatively collected from a part of a bet number of game media for each game when the jackpot is won by lottery conducted at every game; ceiling combination lot drawing means (e.g., CPU 50, S25) for conducting a lottery to determine a game number to trigger the ceiling combination from among a plurality of game numbers; ceiling combination lot re-drawing means (e.g., CPU 50, S44-2) for conducting a lottery to determine whether or not to provide a predetermined award for every game after a total game number reaches the game number having been determined as a result of the lottery conducted by the ceiling combination lot drawing means (e.g., CPU 50, S25); ceiling combination payout means (e.g., CPU 50, S45) for providing a predetermined award when the ceiling combination is won by the lottery conducted by the ceiling combination lot re-drawing means (e.g., CPU 50, S44-2); and reset means (e.g., CPU 50, S46) for resetting the total game number when the predetermined award is provided by the ceiling combination payout means (e.g., CPU 50, S45).

The above gaming machine (e.g., slot machine 1) is characterized in that the ceiling combination lot drawing means (e.g., CPU 50, S25) selects a group of game numbers from among the plurality of game numbers prior to selection of one game number from among the selected group of game numbers.

The above gaming machine (e.g., slot machine 1) further comprises: notification means (e.g., CPU 50, S28) for notifying the predetermined award to be provided by the ceiling combination payout means (e.g., CPU 50, S45) after the total game number reaches a predetermined game number smaller than the game number determined by the ceiling combination lot drawing means (e.g., CPU 50, S25).

Also, a gaming system (e.g., slot system 301) comprises a plurality of gaming machines (e.g., slot machine 1) and a server (e.g., server 302) connected to the plurality of gaming machines. Each gaming machine (e.g., slot machine 1) comprises: display means (e.g., each variable display part 22 to 24) for displaying symbols variably and statically upon betting game media; lottery means (e.g., CPU 50, S112) for conducting a lottery to determine a combination of symbols to be displayed statically on the display means (e.g., each variable display part 22 to 24); and static display control means (e.g., CPU 50, S142) for displaying the combination of symbols statically on the display means (e.g., each variable display part 22 to 24) based on a result of the lottery by the lottery means (e.g., CPU 50, S112) after terminating a variable display of the symbols on the display means (e.g., each variable display part 22 to 24). A predetermined amount is paid out based on the combination of symbols having been displayed statically on the display means (e.g., each variable display part 22 to 24). On the other hand, the server (e.g., server 302) comprises: jackpot control means for providing an amount of a progressive jackpot having been cumulatively collected from a part of betting numbers of game media being bet for every game in each gaming machine (e.g., slot machine 1); ceiling combination lot drawing means (e.g., CPU 304, S207) for conducting a lottery to determine a game number for a predetermined ceiling combination from among a plurality of game numbers; ceiling combination lot re-drawing means (e.g., CPU 304, S210-2) for conducting a lottery to determine whether or not to provide a predetermined award in each gaming machine (e.g., slot machine 1) for every game played in the each gaming machine (e.g., slot machine 1) after a total game number reaches the game number having been determined by the lottery conducted by the ceiling combination lot drawing means (e.g., CPU 304, S207); ceiling combination payout means (e.g., CPU 304, S211) for providing a predetermined award in a winning gaming machine when the ceiling combination is won in the winning gaming machine (e.g., slot machine 1) by the lottery conducted by the ceiling combination lot re-drawing means (e.g., CPU 304, S210-2); and reset means (e.g., CPU 304, S212) for resetting the total game number when the predetermined award is provided by the ceiling combination payout means (e.g., CPU 304, S211).

In the above gaming system (e.g., slot system 301), the ceiling combination lot drawing means (e.g., CPU 304, S207) selects a group of game numbers from among the plurality of game numbers in the server (e.g., server 302) prior to selection of one game number from among the selected group of game numbers.

In the gaming system (e.g., slot system 301), each gaming machine (e.g., slot machine 1) comprises notification means (e.g., CPU 50, S126) for notifying the predetermined award to be provided by the ceiling combination payout means (e.g., CPU 304, S211) after the total game number reaches a predetermined game number smaller than the game number determined by the ceiling combination lot drawing means (e.g., CPU 304, S207).

In the above gaming machine or gaming system, it is determined whether or not to provide the predetermined award for the ceiling combination at every game once the total game number reaches the game number to trigger one of the ceiling combinations having determined as a result of the lottery based on the game numbers to trigger a plurality of ceiling combinations. Therefore, it is possible to encourage the player to continue to play the game even though the player almost gives up winning the progressive jackpot having been accumulated with a part of a bet number of game media bet for every game.

What is claimed is:

1. A gaming machine comprising:

a display device which displays symbols variably and statically upon player's bet; and a processor in communication with the display device, the processor operable to:

(a) conduct a trigger lottery to determine a game number to become eligible for a special award lottery if it is a first game;

(b) select a plurality of symbols to be displayed statically as a game result by a lottery;

(c) display a combination of the selected symbols statically;

(d) provide a player with a predetermined amount for a predetermined winning combination based on the game result corresponding to the predetermined winning combination of symbols;

(e) provide the player with an amount of a progressive jackpot having been cumulatively collected from a part of the bet for each game with the gaming machine and other gaming machines equivalent to the gaming machine when the jackpot is won by a lottery conducted for every game;

(f) conduct the special award lottery to determine whether or not to provide a predetermined award for every game after a total game number reaches the game number having been determined by the trigger lottery, wherein the game number is a number of games played by the player;

(g) provide the player with the predetermined award based on a result of the special award lottery, the predetermined amount for the predetermined winning combination being smaller than the predetermined award, the predetermined award being smaller than the progressive jackpot, and probability to win the special award lottery being higher than probability to win the progressive jackpot; and (h) reset the total game number when the predetermined award is provided.

2. The gaming machine according to claim 1, wherein the processor is operable to cause the display device to notify the player of the predetermined award to be provided after the total game number reaches a predetermined game number smaller than the game number having been determined by the trigger lottery.

3. The gaming machine according to claim 1, wherein the probability to win the special award lottery becomes higher in a stepwise manner as the total game number becomes larger.

4. The gaming machine according to claim 2, wherein notification of the predetermined award to be provided after the total game number reaches the game number determined by the trigger lottery is made earlier by a difference number before the total game number actually reaches the game number determined by the trigger lottery wherein the difference number is larger when the game number determined by the trigger lottery is larger.

5. A gaming system comprising a plurality of gaming machines and a server connected to the plurality of gaming machines, wherein each gaming machine comprises:

a display device which displays symbols variably and statically upon player's bet; and a processor in communication with the display device, the processor operable to:

(a) conduct a trigger lottery to determine a game number to become eligible for a special award lottery if it is a first game;

(b) select a plurality of symbols to be displayed statically as a game result by a lottery;

(c) display a combination of the selected symbols statically;

(d) provide a player with a predetermined amount of a predetermined winning combination based on the game result corresponding to the predetermined winning combination of symbols;

wherein the server comprises another processor operable to:

(e) provide one gaming machine of the plurality of gaming machines with an amount of a progressive jackpot having been cumulatively collected from a part of the bet for each game when the jackpot is won in a lottery conducted in the one gaming machine;

(f) conduct the special award lottery to determine whether or not to provide a predetermined award for every game after a total game number reaches the game number having been determined by the trigger lottery, wherein the game number is a number of games played by the player;

(g) provide the player with the predetermined award based on a result of the special award lottery, the predetermined amount of the predetermined winning combination being smaller than the predetermined award, the predetermined award being smaller than the progressive jackpot, and probability to win the special award lottery being higher than probability to win the progressive jackpot; and (h) reset the total game number to proceed with a next game when the predetermined award is provided.

6. The gaming system according to claim 5, wherein the processor of each gaming machine is operable to cause the display device to notify the player of the predetermined award to be provided after the total game number reaches a predetermined game number smaller than the game number having been determined by the trigger lottery.

7. The gaming system according to claim 5, wherein, in each gaming machine, the probability to win the special award lottery becomes higher in a stepwise manner as the total game number becomes larger.

8. The gaming system according to claim 6, wherein, in each gaming machine, notification of the predetermined award to be provided after the total game number reaches the game number determined by the trigger lottery is made earlier by a difference number before the total game number actually reaches the game number determined by the trigger lottery wherein the difference number is larger when the game number determined by the trigger lottery is larger.

9. The gaming system according to claim 6, wherein the processor of each gaming machine is operable to cause the display device to stop notification when the total game number is reset.

10. The gaming machine according to claim 1, wherein the processor is operable to be capable of providing the predetermined amount for the predetermined winning combination, the amount of the progressive jackpot, and the predetermined award in a streak of the game.

11. The gaming system according to claim 5, wherein the processor of each gaming machine is operable to be capable of providing the predetermined amount for the predetermined winning combination, the amount of the progressive jackpot, and the predetermined award in a streak of the game.

* * * * *